(12) United States Patent
Harada et al.

(10) Patent No.: US 8,406,738 B2
(45) Date of Patent: Mar. 26, 2013

(54) MOBILE TERMINAL AUTHENTICATION METHOD AND SYSTEM

(75) Inventors: Hiromi Harada, Kawasaki (JP); Tatsuhiro Ando, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 12/781,321

(22) Filed: May 17, 2010

(65) Prior Publication Data
US 2010/0330957 A1    Dec. 30, 2010

(30) Foreign Application Priority Data

Jun. 30, 2009    (JP) ................................. 2009-155512

(51) Int. Cl.
*H04M 1/66* (2006.01)
(52) U.S. Cl. ...................... 455/411; 455/406; 455/435.1; 370/338; 370/401
(58) Field of Classification Search .................. 455/406, 455/411, 432.1, 435.1; 370/328, 338, 401
See application file for complete search history.

(56) References Cited

U.S. PATENT DOCUMENTS

| | | | |
|---|---|---|---|
| 7,522,907 B2 * | 4/2009 | Lupper et al. ................. | 455/411 |
| 7,856,226 B2 * | 12/2010 | Wong et al. ................. | 455/414.1 |
| 7,885,654 B2 * | 2/2011 | Fadell ........................ | 455/435.2 |
| 8,194,540 B2 * | 6/2012 | Kim et al. .................... | 370/230 |
| 8,213,934 B2 * | 7/2012 | Tsirtsis et al. .............. | 455/435.1 |
| 8,228,861 B1 * | 7/2012 | Nix .............................. | 370/329 |
| 2004/0017798 A1 | 1/2004 | Hurtta et al. | |
| 2004/0162058 A1 * | 8/2004 | Mottes ........................ | 455/411 |
| 2005/0260997 A1 | 11/2005 | Korale et al. | |
| 2008/0070570 A1 * | 3/2008 | Jiang ............................ | 455/433 |
| 2010/0017861 A1 * | 1/2010 | Krishnaswamy et al. ........ | 726/7 |
| 2010/0232407 A1 * | 9/2010 | Navali et al. ................. | 370/338 |

FOREIGN PATENT DOCUMENTS

| | | |
|---|---|---|
| JP | 2003-534714 | 11/2003 |
| JP | 2005-539462 | 12/2005 |
| JP | 2007-235495 | 9/2007 |

\* cited by examiner

*Primary Examiner* — Sharad Rampuria
(74) *Attorney, Agent, or Firm* — Staas & Halsey LLP

(57) ABSTRACT

A method and system of authenticating a mobile terminal may include using a Mobile Virtual Network Operator (MVNO) authentication device managed by a mobile virtual network operator, receiving an authentication request sent from the mobile terminal from a relay device via a MVNO base station configured to provide a service of the mobile virtual network operator, where the relay device is located between the MVNO base station or a Mobile Network Operator (MNO) base station configured to provide a service of a mobile network operator and the MVNO authentication device or a MNO authentication device managed by the mobile network operator, and determining whether or not access from the mobile terminal, as a MVNO mobile terminal registered as a user of the mobile virtual network operator, based on the authentication request is permitted.

14 Claims, 15 Drawing Sheets

| FIG. 3A |
| FIG. 3B |

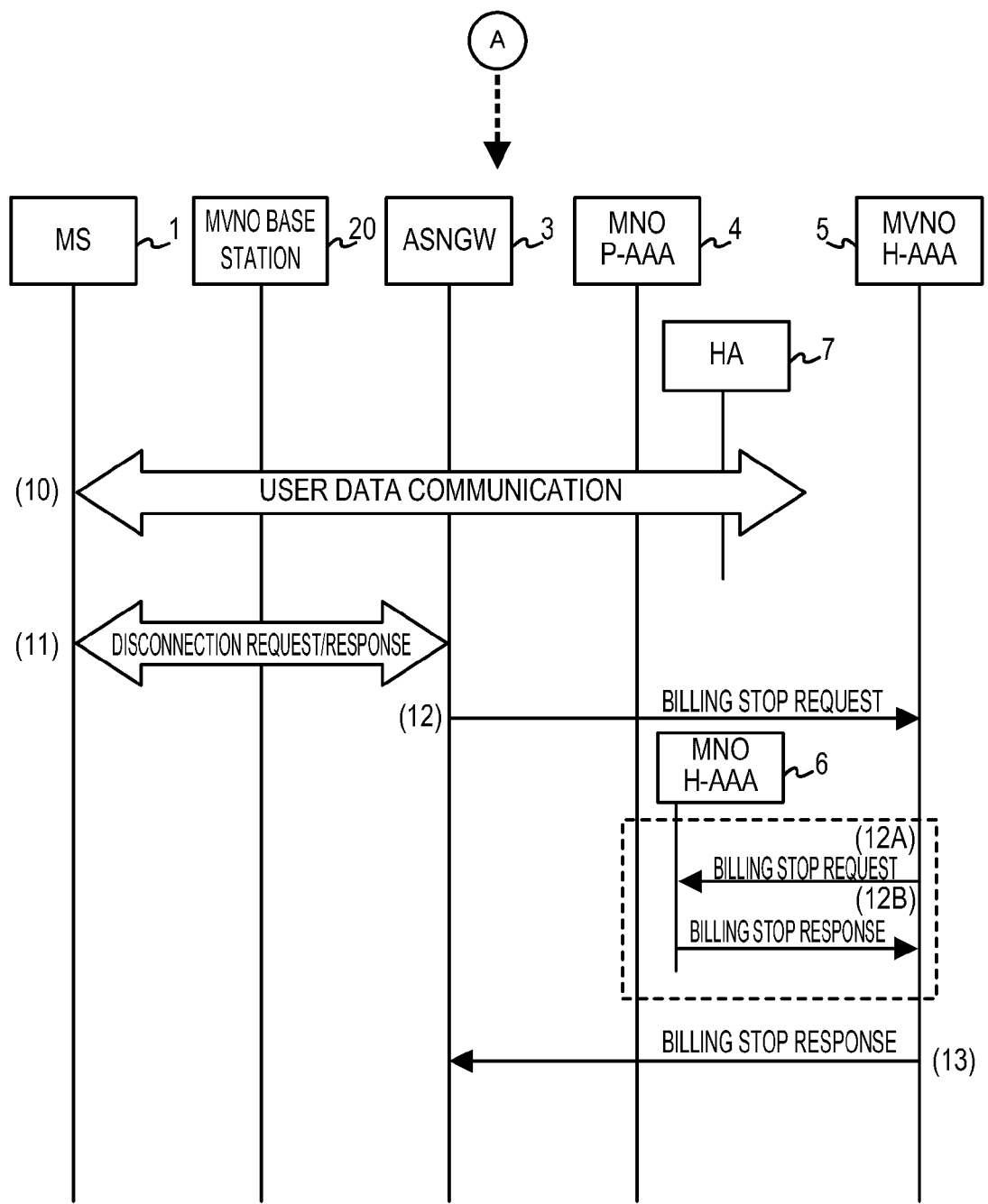

MOBILE TERMINAL AUTHENTICATION METHOD AND SYSTEM

CROSS-REFERENCE TO RELATED APPLICATIONS

This application is based upon and claims the benefit of priority of the prior Japanese Patent Application No. 2009-155512 filed on Jun. 30, 2009, the entire contents of which are incorporated herein by reference.

FIELD

Various embodiments disclosed herein relate to a method and system of authentication and billing of terminal(s) in a radio access network.

BACKGROUND

With the recent prevalence of mobile terminals such as cellular phones, various companies have provided communication service. Providers of communication service include Mobile Network Operators (MNOs) and Mobile Virtual Network Operators (MVNOs). Generally, MNOs are companies that have their own facilities for setting up radio access networks, such as base stations. MVNOs are companies that do not have their own facilities such as base stations and that lease facilities from MNOs to deploy service. The MVNOs handle authentication of MVNO users and billing of usage fees but are not responsible for control or the like of base stations.

FIG. 1 is a diagram illustrating an example of user authentication and billing involved when mobile terminals 100 (100a, 100b, 100c, and 100d) use a radio access network. In FIG. 1, MS stands for Mobile Station. In the illustrated example, it is assumed that the mobile terminals 100a and 100c are MVNO user terminals and that the mobile terminals 100b and 100d are MNO user terminals. The mobile terminals 100 transmit authentication request messages to an Access Service Network Gateway (ASNGW) 300 serving as a relay device via MNO base stations 200 (200a and 200b) controlled by a MNO. The ASNGW 300 transfers the authentication request messages to a Proxy Authentication Authorization Accounting Server (P-AAA server) 400. The P-AAA server 400 sorts the authentication request messages in accordance with whether each of the mobile terminals 100 is a MNO user terminal or a MVNO user terminal. For example, upon receipt of authentication requests from the mobile terminals 100a and 100c that are MVNO user terminals, the P-AAA server 400 transfers the authentication request messages to a Home Authentication Authorization Accounting (H-AAA) server 500 of a MVNO. The H-AAA server 500 performs authentication of MVNO users and handles charges to MVNO users. On the other hand, the mobile terminals 100b and 100d are mobile terminals 100 of MNO users. Thus, upon receipt of authentication request messages from the mobile terminals 100b and 100d, the P-AAA server 400 transfers the authentication request messages to an H-AAA server 600 of the MNO. The H-AAA server 600 of the MNO performs authentication of MNO users and charging to MNO users.

In the related art, for example, Japanese National Publication of International Patent Application No. 2005-539462 describes a radio network control device having independent resource controllers for each operator. It is discussed that the resource controllers allocate radio resource to a subscriber unit in response to an operator ID associated with a service of the subscriber unit so that different qualities of service are achieved for different operators. Furthermore, for example, Japanese Laid-open Patent Publication No. 2007-235495 discusses a base station control device including a database for registering accessible areas for each operator ID of a mobile terminal. In addition, for example, Japanese National Publication of International Patent Application No. 2003-534714 discusses a network including a network element that stores a list of selectable network elements. It is discussed that this list is accessed using an identifier for identifying a routing area, a location area, or the like.

As described above, the authentication request messages transmitted from the mobile terminals 100 are sorted by the P-AAA server 400 of the MNO to the H-AAA servers 500 and 600 of the operators that provide service to the mobile terminals 100. Thus, it may be difficult for the MVNO to perform authentication or billing related processing using information other than the information sent from the mobile terminals 100 to the P-AAA server 400 of the MNO. The MVNO is not enabled to customize authentication or billing related method as desired.

SUMMARY

In accordance with an embodiment, a method of authenticating a mobile terminal using a Mobile Virtual Network Operator (MVNO) authentication device managed by a mobile virtual network operator is provided. The method includes receiving an authentication request sent from the mobile terminal from a relay device via a MVNO base station configured to provide a service of the mobile virtual network operator, where the relay device being located between the MVNO base station or a Mobile Network Operator (MNO) base station configured to provide a service of a mobile network operator and the MVNO authentication device or a MNO authentication device managed by the mobile network operator, and determining whether access from the mobile terminal, as a MVNO mobile terminal registered as a user of the mobile virtual network operator, based on the authentication request is permitted.

An object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3A and 3B are sequence diagrams illustrating examples of an operation for authentication and billing of a mobile terminal via a MVNO base station;

DETAILED DESCRIPTION

Figure 1:
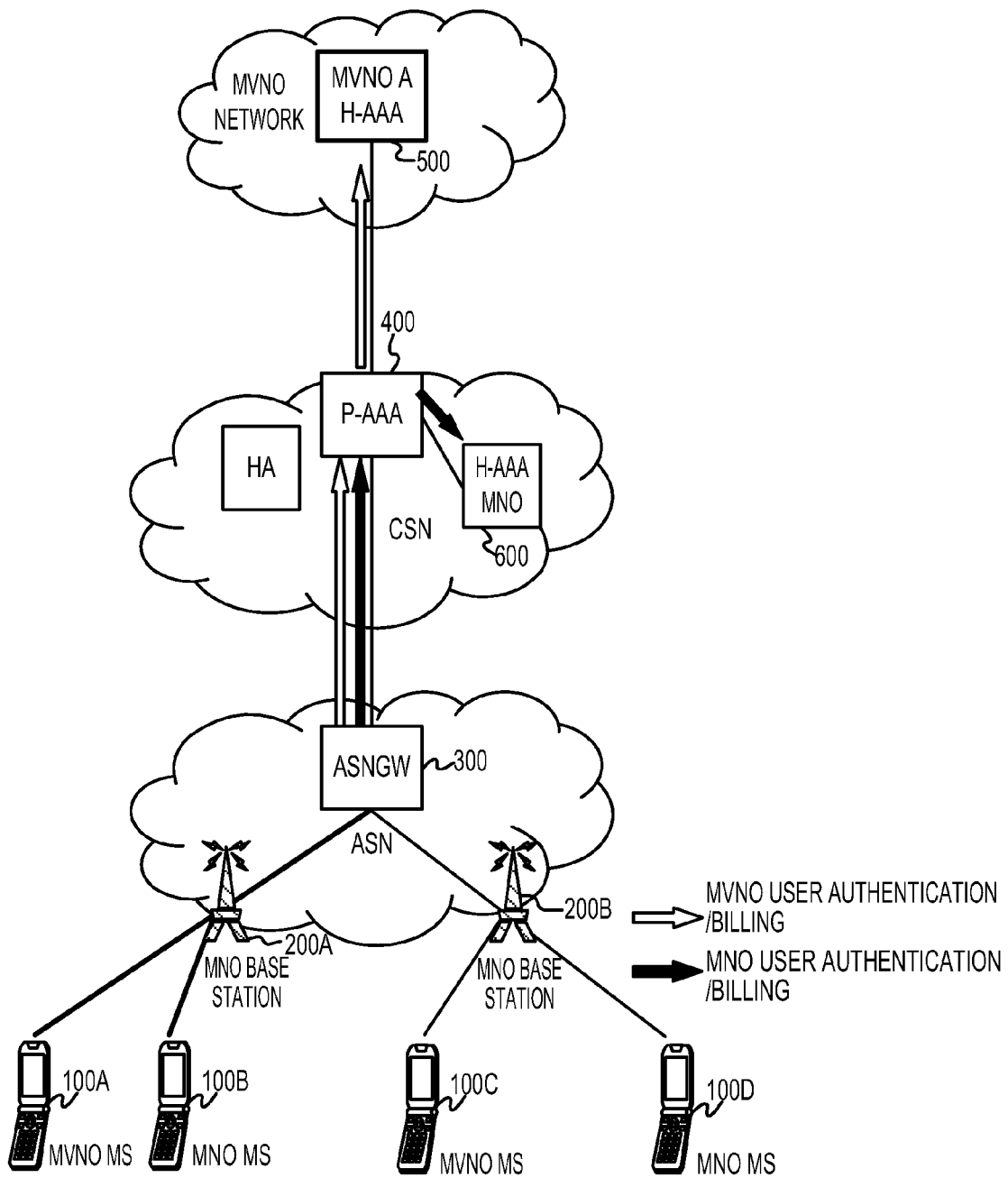
FIG. 1 is a diagram illustrating an example of user authentication and billing involved when a mobile terminal uses a radio access network.

Reference will now be made in detail to the embodiments, examples of which are illustrated in the accompanying drawings, wherein like reference numerals refer to the like elements throughout. The embodiments are described below to explain the present invention by referring to the figures.

A system illustrated in FIGS. 2, 3A, 3B, 4 and 5 includes at least two types of base stations: a MNO base station 2 and a MVNO base station 20. In the following description, it is assumed that, based on agreements or the like between a MNO and a MVNO, the MVNO is allowed to set or change the content or the like of messages sent and received via the MVNO base station 20. Depending on the agreements between the MNO and the MVNO, the operation of MVNO base stations may be performed by the MVNO in place of the MNO, or the MVNO may ask the MNO to install a MVNO base station.

In the system illustrated in FIGS. 2, 3A, 3B, 4 and 5, an ASNGW 3 serving as a relay device determines a transfer destination of a control message transmitted from a mobile terminal 1 in accordance with whether the control message has passed through the MVNO base station 20 or the MNO base station 2. Examples of the control message may include an authentication request message and a billing start request message. When the control message has passed through the MVNO base station 20, the ASNGW 3 transfers the control message to an H-AAA server 5 of the MVNO. That is, the P-AAA server 4 of the MNO is not required to sort control messages sent via the MVNO base station 20. Thus, a message sent via the MVNO base station 20 may include information that is not requested by the MNO, or may have a configuration different from a message used by the MNO. Therefore, the MVNO may select information used for authentication or billing from a wide range, and may easily customize the authentication method, the billing method, and the like. An example of the operation performed in an authentication and billing method according to an embodiment will be described in the context of four cases with reference to FIGS. 2, 3A, 3B, 4 and 5. In the following description, it is assumed that one MVNO and one MNO provide individual service.

Figure 2:
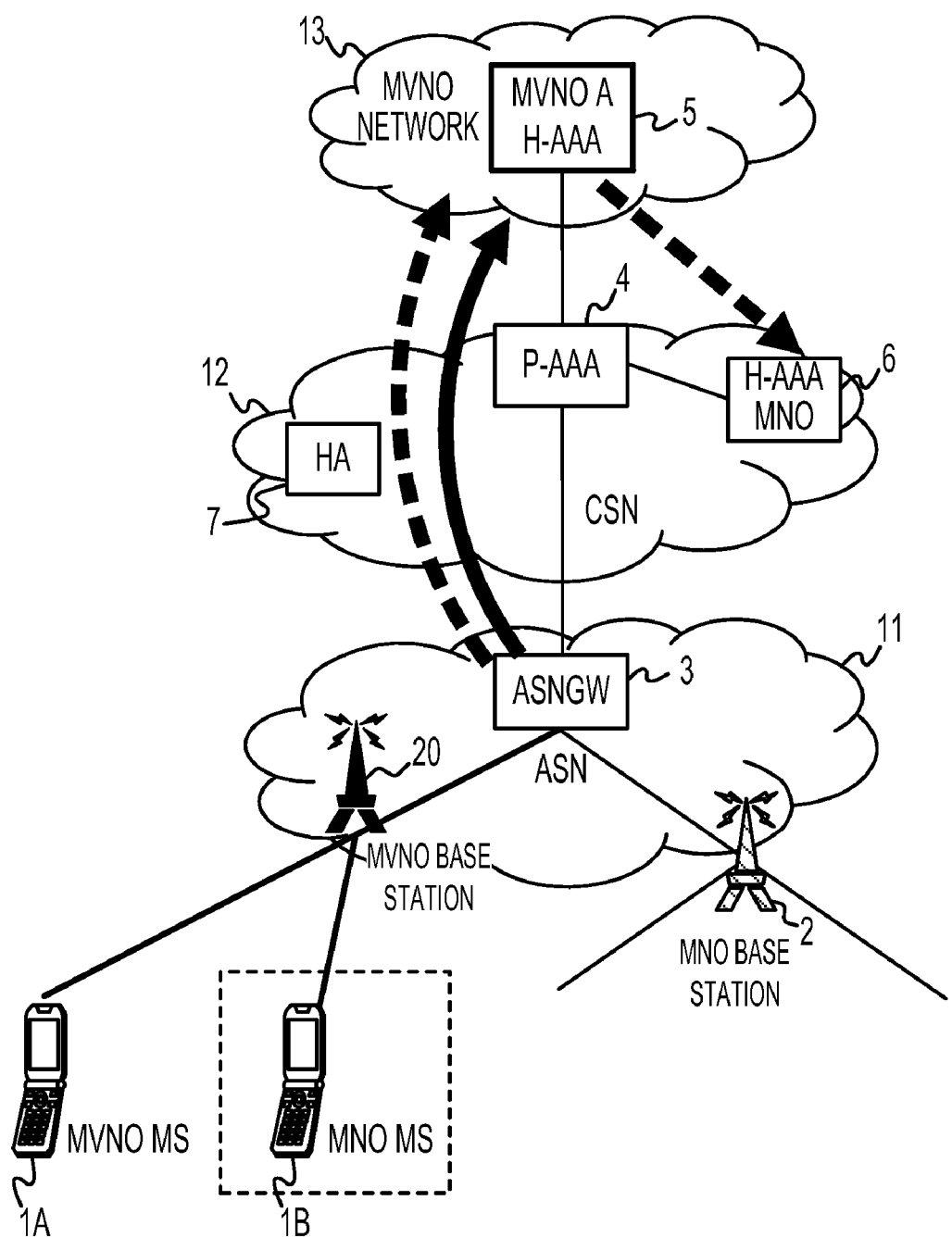
FIG. 2 is a diagram illustrating an example of an operation performed in an authentication and billing method via a MVNO base station.

FIG. 2 is a diagram illustrating an example of the operation performed in an authentication and billing method via a MVNO base station. A system illustrated in FIG. 2 includes an Access Service Network (ASN) 11, a Connectivity Service Network (CSN) 12, and a MVNO network 13. In the illustrated system, a MVNO identifier for uniquely identifying the MVNO and a MNO identifier for uniquely identifying the MNO are used. Furthermore, it is assumed that mobile terminals 1 registered as users of the MVNO, that is, mobile terminals 1a and 1c (see FIG. 4), store a MVNO identifier (MVNO_ID) for identifying the MVNO in which the mobile terminals 1a and 1c are registered. It is also assumed that mobile terminals 1 registered as users of the MNO, that is, mobile terminals 1b and 1d (see FIG. 4), store a MNO identifier for identifying the MNO in which the mobile terminals 1b and 1d are registered. MS stands for Mobile Station.

The ASN 11 includes the base stations (2, 20) and the ASNGW 3, and is configured to perform processing relating to radio access. The MNO base station 2 and the MVNO base station 20 provide radio access to the mobile terminals 1 by, for example, relaying control messages such as authentication request messages. The MNO base station 2 and the MVNO base station 20 are assigned base station identifiers for base station identity. In the following description, the MNO base station 2 may also be referred to as a "MNO base station" to clarify the difference between the MNO base station 2 and the MVNO base station 20. The MNO base station may notify the mobile terminals 1 of information about service regarding communication performed via the MNO base station, as described below.

The MVNO base station 20 may set a billing condition for the use of the MVNO base station 20 in accordance with the setting conditions notified by the H-AAA server 5. The MVNO base station 20 may also notify the mobile terminals 1 of service information such as the content of service or a billing condition for communication performed via the MVNO base station 20.

The ASNGW 3 supports or manages authentication, and determines the authentication device to which an authentication request message received from a mobile terminal 1 is transferred to in accordance with, for example, the base station through which the authentication request message has passed. The ASNGW 3 stores information of the base stations such as at least the base station identifier of the MVNO base station 20 connected to the ASNGW 3. The ASNGW 3 also stores a MVNO identifier for identifying the MVNO that provides communication service via the MVNO base station 20. Further, the ASNGW 3 stores the MNO identifier of the MNO that permits the transfer of a control message received via the MVNO base station 20 when service is provided to a user of the MNO via the MVNO base station 20.

The ASNGW 3 transfers the control message received via the MVNO base station 20 to the MVNO A H-AAA server 5 of the MVNO. Here, the ASNGW 3 may also be designed to transfer the control message to the H-AAA server 5 of the MVNO when a MVNO identifier or the MNO identifier of the MNO that permits the transfer of the control message is assigned. In contrast, upon receipt of a control message via the MNO base station 2, the ASNGW 3 transfers the control message to the H-AAA server 6 of the MNO. The transfer of the control message is described in detail below. The ASNGW 3 may store the MVNO identifier or the MNO identifier in a memory in table or database form.

The ASNGW 3 may also record in a table or a database a terminal identifier for specifying a mobile terminal of a MNO user or a MVNO user who is permitted to perform communication via the MVNO base station 20, and may store the terminal identifier in the memory. Further, the ASNGW 3 may perform processes such as processes for billing information, management of radio resource, management of transmission resource, processes regarding handover or location update, and termination of radio-related functionality. While specific processes are described herein as examples, the present invention is not limited to performing any particular type of process.

The CSN 12 includes the P-AAA server 4, the H-AAA server 6, and a Home Agent (HA) 7, which are used to perform processes such as connection to the Internet, connection to the MVNO network 13, authentication using an authentication server, and home agent processes based on the Mobile Internet Protocol (IP).

The P-AAA server 4 and the H-AAA server 6 of the MNO perform an authentication or billing process on MNO users. As described below, for example, upon receipt of an authentication request from the ASNGW 3, the P-AAA server 4 transfers an authentication request sent from a MNO user to the H-AAA server 6 of the MNO, and transfers an authentication request sent from a MVNO user to the H-AAA server 5 of the MVNO. The H-AAA server 6 of the MNO processes an authentication request, a billing request, or the like transferred from the P-AAA server 4 or the H-AAA server 5 of the MVNO to perform authentication or billing on MNO users. The home agent 7 registers the mobile terminals 1 or manages position information. The home agent 7 further intercepts packets transmitted to the mobile terminals 1 or packets transmitted from the mobile terminals 1, and relays the intercepted packets to the destination such as the mobile terminals 1.

The MVNO network 13 is a network provided by the MVNO, and includes the H-AAA server 5 of the MVNO. The H-AAA server 5 of the MVNO performs authentication and billing on MVNO users. In addition, for example, the H-AAA server 5 may also notify the H-AAA server 6 of the MNO of an authentication request from a MNO user or a calculated amount to be charged for the use by a MNO user. Further, the H-AAA server 5 may set a billing condition suitable for the MVNO base station 20. For example, the H-AAA server 5 may set an additional fee for a MVNO base station 20 that is installed in a less accessible region such as an island or a mountainous region, and may send the setting to the MVNO base station 20.

An operation performed in Case 1 when the mobile terminal 1a that is a MVNO user terminal requests authentication via the MVNO base station 20 will now be described with reference to FIG. 2.

First, the mobile terminal 1a located in the communication area of the MVNO base station 20 is connected to the MVNO base station 20. The MVNO base station 20 notifies the mobile terminal 1a of a base station identifier for identifying the MVNO base station 20 using, for example, a notification signal or the like before a connection is established with the mobile terminal 1a. When a connection is established between the mobile terminal 1a and the MVNO base station 20, the mobile terminal 1a establishes a radio link with the ASNGW 3.

When a radio link is established with the ASNGW 3, the mobile terminal 1a generates an authentication request message for requesting the MVNO in which the mobile terminal 1a is registered as a user to authenticate the mobile terminal 1a. The authentication request message includes the base station identifier of the MVNO base station 20 connected to the mobile terminal 1a, and the MVNO identifier for identifying the MVNO requested by the mobile terminal 1a to perform authentication. The mobile terminal 1a transmits the authentication request message to the ASNGW 3 via the MVNO base station 20.

The ASNGW 3 specifies the base station through which the received authentication request message has passed on the basis of the base station identifier included in the received authentication request message. Upon recognition that the authentication request message has passed through the MVNO base station 20, the ASNGW 3 determines that the authentication request message is transferred to the H-AAA server 5 of the MVNO. Then, it is determined whether or not the MVNO identifier included in the authentication request message is equal to the MVNO identifier of the MVNO determined by the ASNGW 3 as the transfer destination of the authentication request message. When the MVNO identifier is equal to (matches) the identifier of the transfer destination of the authentication request message, the ASNGW 3 transfers the authentication request message to the H-AAA server 5 of the MVNO.

Upon receipt of the authentication request message from the ASNGW 3, the H-AAA server 5 of the MVNO authenticates the mobile terminal 1a, and transmits an authentication response message to the ASNGW 3. The ASNGW 3 transfers the response message to the mobile terminal 1a via the MVNO base station 20. When authentication has succeeded, the communication service to the mobile terminal 1a is started via the MVNO base station 20.

With the use of the above authentication method, the H-AAA server 5 of the MVNO may receive an authentication request message directly from the ASNGW 3. Thus, the information used by the H-AAA server 5 for authentication or the authentication request message may have a different configuration from information or a message used by the H-AAA server 6 of the MNO.

Figures 3, 3A:
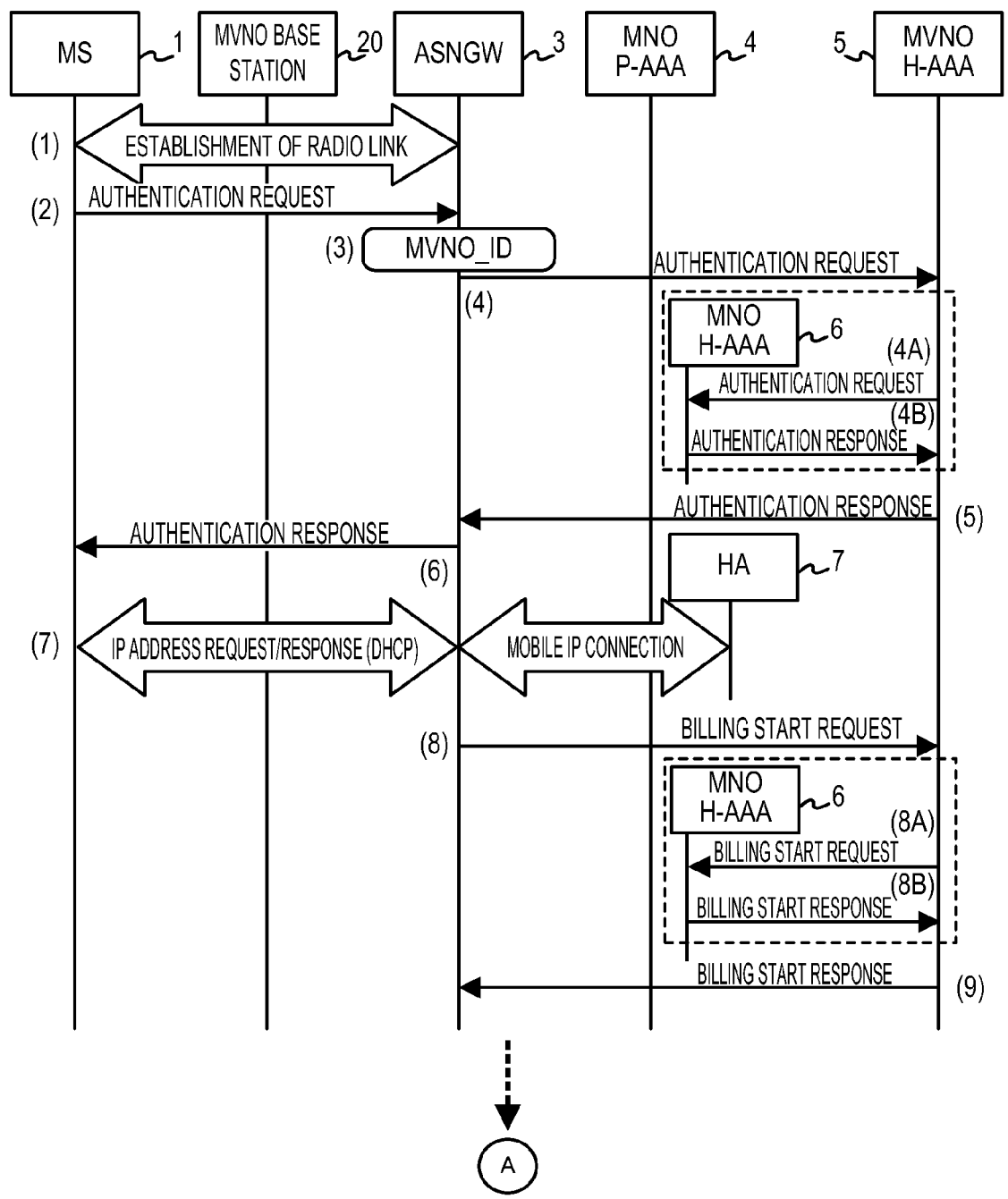

FIG. 3 is a sequence diagram illustrating an example of an operation for authentication and billing of a mobile terminal 1 via the MVNO base station 20. The authentication and billing involved when the mobile terminal 1a performs communication via the MVNO base station 20 will be described with reference to FIG. 3.

(1) A radio link is established between the mobile terminal 1a and the ASNGW 3. As described above, before a radio link is established, the mobile terminal 1a is connected to the MVNO base station 20 located between the mobile terminal 1a and the ASNGW 3, and obtains the base station identifier of the MVNO base station 20.

(2) The mobile terminal 1a transmits an authentication request message to the ASNGW 3. The authentication request message includes a base station identifier for identifying the MVNO base station 20 and a MVNO identifier.

(3) The ASNGW 3 compares the base station identifier included in the received authentication request message with the base station identifier stored in advance, and determines whether or not the received authentication request message has passed through the MVNO base station 20. Alternatively, when the ASNGW 3 stores the relationship between the numbers of ports and the base stations (2, 20) connected to the ports, the ASNGW 3 may determine whether or not the received authentication request message has passed through the MVNO base station 20 on the basis of the number of the port through which the authentication request message has been received.

Then, the ASNGW 3 checks the MVNO identifier, and determines whether or not the authentication request message is transferred. Here, it is assumed that the authentication request message includes the MVNO identifier of the MVNO to which the ASNGW 3 transfers the authentication request message and that it is determined that the authentication request message is transferred to the H-AAA server 5. Note that the ASNGW 3 may discard an authentication request message that is not transferred to the H-AAA server 5.

(4) The ASNGW 3 transfers the authentication request message including the MVNO identifier to the H-AAA server 5 of the MVNO.

(5) The H-AAA server 5 of the MVNO compares the MVNO identifier assigned to the MVNO that operates the H-AAA server 5 with the MVNO identifier included in the authentication request message, and checks whether both match. When the MVNO identifiers match, the H-AAA server 5 determines whether or not the access from the mobile terminal 1a is permitted on the basis of the received authentication request message, and transmits an authentication response message to the ASNGW 3. Here, it is assumed that the access from the mobile terminal 1a is permitted.

(6) The ASNGW 3 transfers the authentication response message to the mobile terminal 1a via the MVNO base station 20.

(7) When the access is permitted, the mobile terminal 1a queries the ASNGW 3 about an assigned IP address using, for example, the Dynamic Host Configuration Protocol (DHCP). When the mobile terminal 1a is informed of the assigned IP address, a connection is established between the home agent 7 that transfers packets to the mobile terminal 1a and the ASNGW 3.

(8) The ASNGW 3 transmits a billing start request message to the H-AAA server 5.

(9) The H-AAA server 5 transmits a billing start response message to the ASNGW 3 in response to the billing start request message, and starts billing for the communication of the mobile terminal 1a.

(10) The mobile terminal 1a performs user data communication with the communication destination such as the counterpart terminal via the home agent 7. During the user data communication, the H-AAA server 5 may receive a notification of information used for the calculation of an amount to be charged from the ASNGW 3, the MVNO base station 20, or the like. In this case, the H-AAA server 5 requests the ASNGW 3 or the MVNO base station 20 to transmit the information used for the calculation of the amount to be charged in accordance with the setting of the MVNO. For example, the H-AAA server 5 may specify, as the information used for the calculation of the amount to be charged, the use status such as the number of packets used by the mobile terminal 1a or the communication time, the base station identifier of the MVNO base station 20, and the like.

(11) When the mobile terminal 1a completes the communication, the mobile terminal 1a transmits a disconnection request message to the ASNGW 3, and the ASNGW 3 transmits a disconnection response message to the mobile terminal 1a.

(12) When the mobile terminal 1a completes the communication, the ASNGW 3 transmits a billing stop request message to the H-AAA server 5. The ASNGW 3 may notify the H-AAA server 5 of the use status such as the number of packets or the call time when transmitting a billing stop request message.

(13) Then H-AAA server 5 calculates the amount to be charged on the basis of the use status or the like. Further, the H-AAA server 5 transmits a billing stop response message to the ASNGW 3, and the billing-related process ends.

Accordingly, during authentication or billing, an authentication request message or a billing start request message is transmitted from the ASNGW 3 directly to the H-AAA server 5. Therefore, the information used by the H-AAA server 5 about authentication or billing of access from the mobile terminal 1a that performs communication via the MVNO base station 20 may be different from the information sent to the P-AAA server 4 of the MNO. Thus, for example, the MVNO may take a billing method or an authentication method that is different from the billing method or authentication method of the MNO. For example, the MVNO may change the amount to be charged in accordance with the place where the MVNO base station 20 is installed, and may provide a modified billing rate such as a phone call fee discount for a limited time or additional charge for donation for a limited time, regardless of the billing condition of the MNO.

In the operation described in Case 1, the ASNGW 3 selects an authentication request message to be transferred in procedure (3). In this manner, the ASNGW 3 selects a control message to be processed, thereby preventing a control message that is not processed by the H-AAA server 5 or 6 from being transferred to the H-AAA server 5. Therefore, the process of the ASNGW 3 may reduce the load on the H-AAA server 5.

An operation performed in Case 2 when the mobile terminal 1b that is a MNO user terminal requests authentication via the MVNO base station 20 will now be described with reference to FIG. 2. Note that the MVNO may reject the authentication of the mobile terminal 1b of the MNO user via the MVNO base station 20. When the authentication of the mobile terminal 1b is rejected, the operation of Case 2 is not performed.

First, the mobile terminal 1b located in the communication area of the MVNO base station 20 is connected to the MVNO base station 20, and establishes a radio link with the ASNGW 3. As in Case 1, the mobile terminal 1b is notified of a base station identifier for identifying the MVNO base station 20 using, for example, a notification signal or the like, and the establishment of a radio link is also performed in a procedure similar to that of Case 1.

Then, the mobile terminal 1b creates an authentication request message including the base station identifier of the MVNO base station 20 and a MNO identifier, and transmits the authentication request message to the ASNGW 3 via the MVNO base station 20. Upon receipt of the authentication request message including the base station identifier of the MVNO base station 20, the ASNGW 3 determines that the transfer destination is the H-AAA server 5 of the MVNO. Further, the ASNGW 3 compares the MNO identifier included in the authentication request message with the MNO identifier stored in advance, and determines whether or not the authentication request message is transferred. When both match, the ASNGW 3 transfers the authentication request message to the H-AAA server 5 of the MVNO.

Upon receipt of the authentication request message from the ASNGW 3, the H-AAA server 5 of the MVNO determines whether the authentication request message includes a MVNO identifier or a MNO identifier. Upon detection of a MNO identifier, the H-AAA server 5 determines that the mobile terminal 1b is a mobile terminal 1 of a MNO user.

The H-AAA server 5 of the MVNO transfers the authentication request message about the access from the mobile terminal 1b to the H-AAA server 6 of the MNO. The H-AAA server 6 of the MNO authenticates the mobile terminal 1b, and transmits an authentication response message to the H-AAA server 5 of the MVNO. The H-AAA server 5 of the MVNO transfers the authentication response message to the ASNGW 3, and the ASNGW 3 transfers the authentication response message to the mobile terminal 1b via the MVNO base station 20. When authentication has succeeded, the communication service to the mobile terminal 1b is started via the MVNO base station 20.

The authentication and billing procedure involved when the mobile terminal 1b performs communication via the MVNO base station 20 will be described with reference to FIG. 3. In Case 2, in addition to the operation performed in Case 1, operations indicated by dotted blocks in FIG. 3 are performed. The establishment of a radio link between the MVNO base station 20 and the mobile terminal 1b is performed in a way similar to that in procedure (1) described in Case 1.

(2) The mobile terminal 1b transmits an authentication request message to the ASNGW 3. The authentication request message includes a base station identifier for identifying the MVNO base station 20 and a MNO identifier.

(3) The ASNGW 3 recognizes that an authentication request message that has passed through the MVNO base station 20 has been received using the base station identifier. Then, the ASNGW 3 checks the MNO identifier, and determines whether or not the authentication request message is transferred. Here, it is assumed that a setting is made so that the ASNGW 3 transfers an authentication request message of a MNO user and that the authentication request message is to be transferred to the H-AAA server 5.

(4) The ASNGW 3 transfers the authentication request message including the MNO identifier to the H-AAA server 5 of the MVNO.

(4a) The H-AAA server 5 of the MVNO transfers the authentication request message including the MNO identifier to the H-AAA server 6 of the MNO. The H-AAA server 6 of the MNO authenticates the mobile terminal 1b. Here, it is assumed that the access from the mobile terminal 1b is authorized.

(4b) The H-AAA server 6 of the MNO transmits an authentication response message to the H-AAA server 5 of the MVNO.

(5) The H-AAA server 5 of the MVNO transfers the authentication response message to the ASNGW 3.

The procedure from the operation for transferring the authentication response message from the ASNGW 3 to the mobile terminal 1b to the operation for transmitting a billing start request message to the H-AAA server 5 is similar to that in procedures (6) to (8) described in Case 1.

(8a) The H-AAA server 5 of the MVNO transfers the billing start request message to the H-AAA server 6 of the MNO.

(8b) The H-AAA server 6 of the MNO transmits a billing start response message to the H-AAA server 5 of the MVNO in response to the billing start request message.

(9) The H-AAA server 5 of the MVNO transfers the billing start response message to the ASNGW 3, and performs a process for calculating the amount to be charged for the communication of the mobile terminal 1b. That is, the H-AAA server 5 of the MVNO calculates the amount to be charged for the use of service by the mobile terminal 1b on behalf of the H-AAA server 6 of the MNO.

(10) The mobile terminal 1b performs user data communication with the communication destination such as the counterpart terminal via the home agent 7. During the user data communication, the H-AAA server 5 of the MVNO receives a notification of information used for the calculation of the amount to be charged from the ASNGW 3, the MVNO base station 20, or the like. As in Case 1, the information used for the calculation of the amount to be charged may be information corresponding to the setting of the MVNO.

(11) When the mobile terminal 1b completes the communication, the mobile terminal 1b transmits a disconnection request message to the ASNGW 3, and the ASNGW 3 transmits a disconnection response message to the mobile terminal 1b.

(12) When the mobile terminal 1b completes the communication, the ASNGW 3 transmits a billing stop request message to the H-AAA server 5.

(12a) The H-AAA server 5 of the MVNO transfers the billing stop request message to the H-AAA server 6 of the MNO. When the H-AAA server 5 of the MVNO calculates the amount to be charged for the communication of the mobile terminal 1b before the billing stop request message is transferred, the H-AAA server 6 of the MNO may be notified of the amount to be charged together with the billing stop request message.

(12b) Upon receipt of the billing stop request message, the H-AAA server 6 of the MNO transmits a billing stop response message to the H-AAA server 5 of the MVNO.

(13) The H-AAA server 5 of the MVNO transfers the billing stop response message to the ASNGW 3. The H-AAA server 5 of the MVNO may also transfer the billing stop response message and then calculate the amount to be charged to the mobile terminal 1b.

Accordingly, during the authentication or billing of a MNO user, an authentication request message or a billing start request message is transmitted to the H-AAA server 5 of the MVNO, and is then transferred to the H-AAA server 6 of the MNO. Therefore, the MNO selects information used for the authentication of a user accessing via the MVNO base station 20 from the information included in the authentication request message received by the H-AAA server 5 of the MVNO. Furthermore, since the H-AAA server 5 of the MVNO calculates the amount to be charged, even when the MNO and the MVNO calculate the amount to be charged or the like using different methods, the amount to be charged for the communication of the mobile terminal 1b is calculated using a calculation method used by the MVNO.

When the ASNGW 3 stores the terminal identifier of the MNO user who is permitted to perform communication via the MVNO base station 20, the ASNGW 3 compares the terminal identifier included in the authentication request message with the stored terminal identifier in procedure (3). When the terminal identifier included in the authentication request message matches the terminal identifier stored in the ASNGW 3, the authentication request message is transferred to the H-AAA server 5. In this modification, the content of service may be changed and/or customized for each user. For example, a specific user among MNO users may be permitted to perform communication via the MVNO base station 20.

Figure 4:
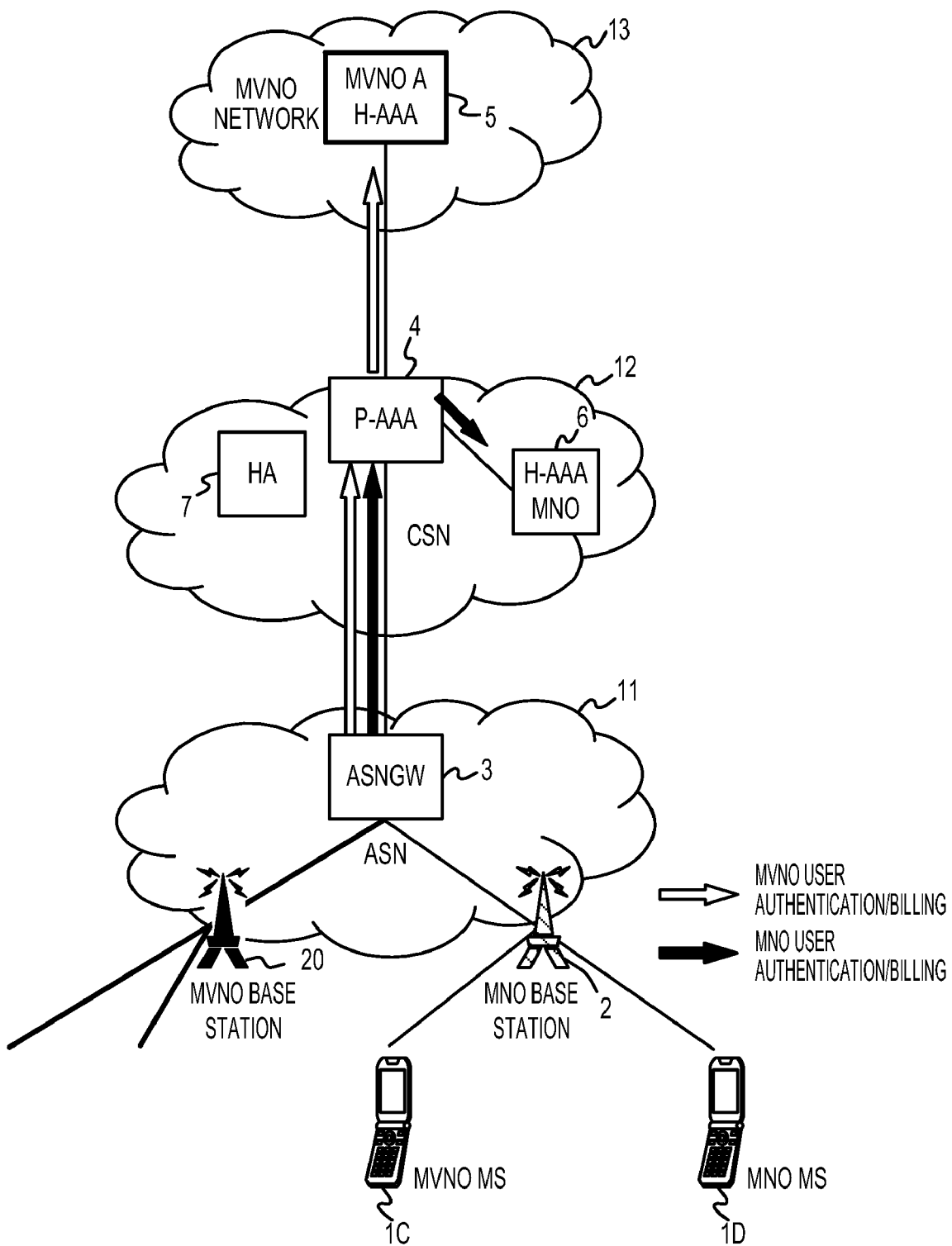
FIG. 4 is a diagram illustrating an example of an operation performed when a mobile terminal requests authentication via a MNO base station.

An operation performed in Case 3 when the mobile terminal 1c that is a MVNO user terminal requests authentication via the base station 2 will now be described with reference to FIG. 4.

First, the mobile terminal 1c located in the communication area of the MNO base station 2 is connected to the MNO base station 2. When a connection is established between the mobile terminal 1c and the base station 2, the mobile terminal 1c establishes a radio link with the ASNGW 3. When a radio link is established with the ASNGW 3, the mobile terminal 1c generates an authentication request message for requesting authentication, and transmits the authentication request message to the ASNGW 3 via the MNO base station 2. The authentication request message includes a MVNO identifier for identifying the MVNO in which the mobile terminal 1c is registered as a user. However, the authentication request message may not necessarily include the base station identifier of the MNO base station 2 to which the mobile terminal 1c is connected.

Upon confirmation that the received authentication request message includes no base station identifiers, the ASNGW 3 recognizes that the authentication request message has been transmitted via the MNO base station 2. Then, the ASNGW 3 transfers the authentication request message to the P-AAA server 4 of the MNO.

Upon receipt of the authentication request message, the P-AAA server 4 of the MNO determines whether the mobile terminal 1c that is requesting authentication using the message is a mobile terminal of a MNO user or a mobile terminal of a MVNO user. In this case, when the authentication request message includes a MVNO identifier, the P-AAA server 4 determines that the authentication request message is an authentication request message sent from a MVNO user terminal. Then, the P-AAA server 4 determines that the mobile terminal 1c is a mobile terminal 1 of a MVNO user, and transfers the authentication request message to the H-AAA server 5 of the MVNO.

Upon receipt of the authentication request message, the H-AAA server 5 of the MVNO authenticates the mobile terminal 1c, and transmits an authentication response message to the P-AAA server 4. The P-AAA server 4 transfers the response message to the mobile terminal 1c via the ASNGW 3 and the MNO base station 2. When authentication has succeeded, the communication service to the mobile terminal 1c is started via the MNO base station 2.

In the foregoing description, the authentication request message transmitted from the mobile terminal 1c includes no base station identifiers. However, the mobile terminal 1c may transmit an authentication request message including a base station identifier for identifying the MNO base station 2 to the ASNGW 3. In this case, upon confirmation that the authentication request message includes the base station identifier of the MNO base station 2, the ASNGW 3 may transmit the authentication request message to the P-AAA server 4. That is, the ASNGW 3 may transfer a message that has passed through the MVNO base station 20 to the H-AAA server 5 (Case 1), and may transfer a message that has passed through the MNO base station 2 to the P-AAA server 4 (Case 3). In this manner, the ASNGW 3 may determine a transfer destination of an authentication request message in accordance with the base station through which the authentication request message has passed.

Figure 5:
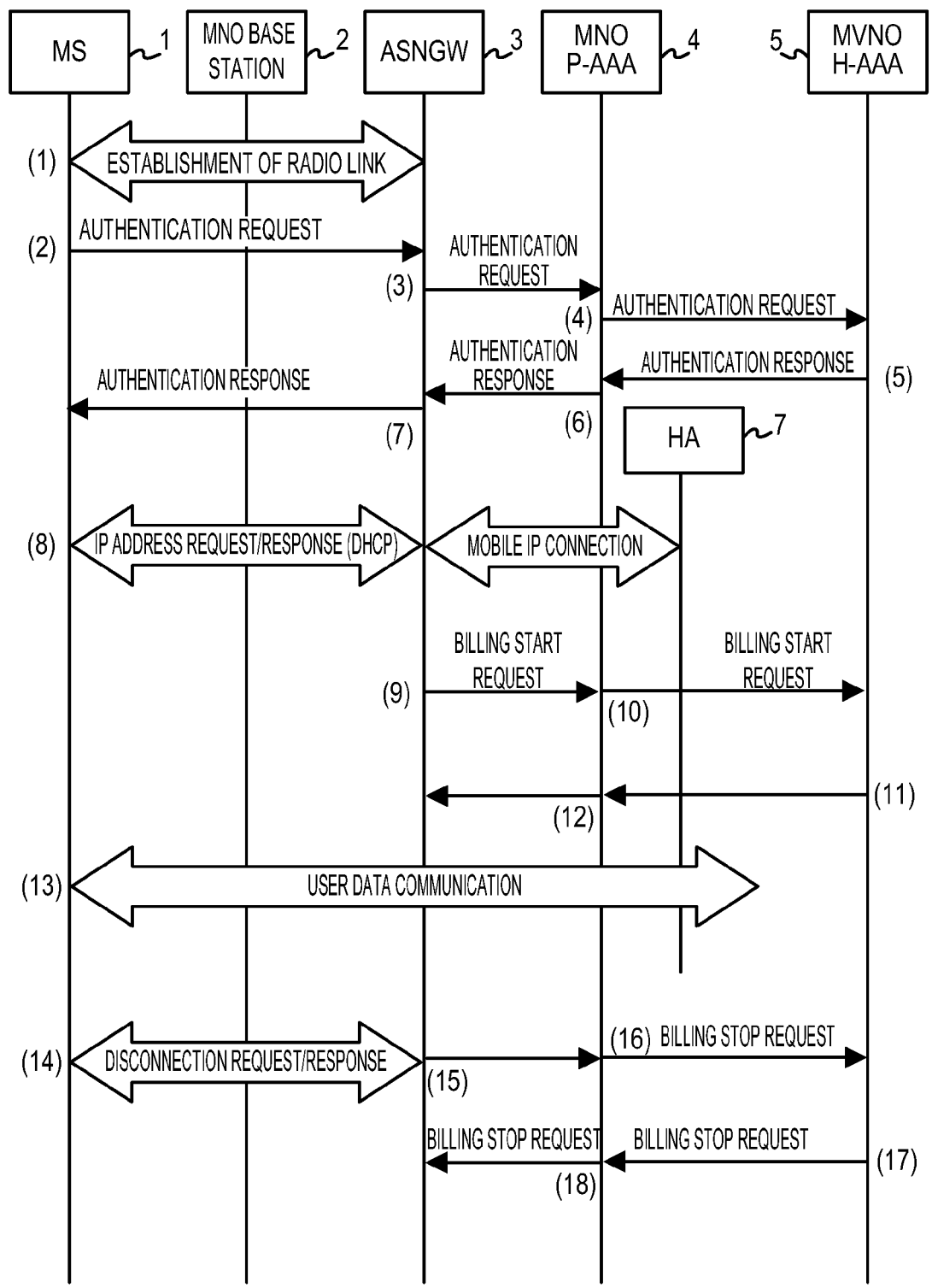
FIG. 5 is a sequence diagram illustrating an example of an operation for authentication and billing of a mobile terminal via a MNO base station.

FIG. 5 is a sequence diagram illustrating an example of an operation for authentication and billing of the mobile terminal 1c via the MNO base station 2. The authentication and billing involved when the mobile terminal 1c performs communication via the MNO base station 2 will be described with reference to FIG. 5.

(1) A radio link is established between the mobile terminal 1c and the ASNGW 3.

(2) The mobile terminal 1c transmits an authentication request message including a MVNO identifier to the ASNGW 3.

(3) The ASNGW 3 transfers the authentication request message received via the MNO base station 2 to the P-AAA server 4 of the MNO. It may be determined that the authentication request message has passed through the MNO base station 2 on the basis of, as described above, the authentication request message that includes no base station identifiers.

(4) Upon detection that the mobile terminal 1c is a MVNO user terminal on the basis of the MVNO identifier included in the authentication request message, the P-AAA server 4 transfers the authentication request message to the H-AAA server 5 of the MVNO.

(5) The H-AAA server 5 of the MVNO determines, on the basis of the received authentication request message, whether or not the access from the mobile terminal 1c is permitted, and transmits an authentication response message to the P-AAA server 4 of the MNO. Here, it is assumed that the access from the mobile terminal 1c is permitted.

(6) The P-AAA server 4 of the MNO transfers the authentication response message to the ASNGW 3.

(7) The ASNGW 3 transfers the authentication response message to the mobile terminal 1c via the MNO base station 2.

(8) When the access is permitted, a connection is established between the mobile terminal 1c and the home agent 7 via the ASNGW 3 using the IP address assigned to the mobile terminal 1c.

(9) The ASNGW 3 transmits a billing start request message to the P-AAA server 4 of the MNO.

(10) Since the mobile terminal 1c is a mobile terminal 1 of a MVNO user, the P-AAA server 4 of the MNO transfers the billing start request message to the H-AAA server 5 of the MVNO.

(11) The H-AAA server 5 of the MVNO transmits a billing start response message to the P-AAA server 4 of the MNO, and starts billing for the communication of the mobile terminal 1c.

(12) The P-AAA server 4 of the MNO transfers the billing start response message to the ASNGW 3.

(13) The mobile terminal 1c performs user data communication with the communication destination such as the counterpart terminal via the home agent 7. During the user data communication, the H-AAA server 5 receives a notification of information used for the calculation of the amount to be charged from the ASNGW 3, the MNO base station 2, or the like via the P-AAA server 4.

(14) When the mobile terminal 1c completes the communication, the mobile terminal 1c transmits a disconnection request message to the ASNGW 3, and the ASNGW 3 transmits a disconnection response message to the mobile terminal 1c.

(15) When mobile terminal 1c completes the communication, the ASNGW 3 transmits a billing stop request message to the P-AAA server 4 of the MNO.

(16) The P-AAA server 4 of the MNO transfers the billing stop request message to the H-AAA server 5 of the MVNO.

(17) The H-AAA server 5 of the MVNO transmits a billing stop response message to the P-AAA server 4 of the MNO. The H-AAA server 5 calculates the amount to be charged on the basis of the use status or the like.

(18) The billing stop response message is transferred from the P-AAA server 4 to the ASNGW 3, and the billing-related process ends.

An operation performed in Case 4 when the mobile terminal 1d that is a MNO user terminal requests authentication via the MNO base station 2 will now be described with reference to FIG. 4. The mobile terminal 1d located in the communication area of the MNO base station 2 is connected to the MNO base station 2 and then establishes a radio link with the ASNGW 3. Then, the mobile terminal 1d generates an authentication request message including a MNO identifier, and transmits the authentication request message to the ASNGW 3 via the MNO base station 2.

The ASNGW 3 recognizes that the authentication request message has been transmitted via the MNO base station 2 operated by the MNO using any of the methods described in Case 3, and transfers the authentication request message to the P-AAA server 4 of the MNO.

Upon confirmation that the authentication request message includes a MNO identifier, the P-AAA server 4 of the MNO determines that the mobile terminal 1*d* that is requesting authentication is a mobile terminal of a MNO user. Then, the P-AAA server 4 transfers the authentication request message to the H-AAA server 6 of the MNO.

Upon receipt of the authentication request message, the H-AAA server 6 of the MNO authenticates the mobile terminal 1*d*, and transmits an authentication response message to the P-AAA server 4. The P-AAA server 4 transfers the response message to the mobile terminal 1*d* via the ASNGW 3 and the MNO base station 2. When authentication has succeeded, the communication service to the mobile terminal 1*d* is started via the MNO base station 2.

The operation for the authentication and billing of the mobile terminal 1*d* of the MNO user is almost similar to the operation described in Case 3 with reference to FIG. 5. However, the authentication and billing of the MNO user is performed by the H-AAA server 6 of the MNO. Thus, the operation performed by the H-AAA server 5 of the MVNO in procedures (4), (5), (10), (11), (16), and (17) described in Case 3 is performed by the H-AAA server 6 of the MNO in Case 4.

As described above, in the system that operates in the manner described in Cases 1 to 4, an authentication request message transmitted to the ASNGW 3 via the MVNO base station 20 is transmitted to the H-AAA server 5 of the MVNO. That is, independently of whether a mobile terminal 1 is a MVNO user terminal or a MNO user terminal, the transfer destination of the authentication request message is determined in accordance with the base station through which the authentication request message has passed. Therefore, as described in Cases 1 and 2, an authentication request message that has passed through the MVNO base station 20 is transferred to the H-AAA server 5 regardless of whether the authentication request message has been transmitted from a MNO user terminal or a MVNO user terminal. In the description with reference to FIGS. 2, 3A, 3B, 4, 5 and 6, the ASNGW 3 and the like transfer a received authentication request message. However, a Remote Authentication Dial In User Service (RADIUS) message may be generated based on a received authentication request message, and may be transmitted.

As described above, an authentication request message that has passed through the MVNO base station 20 is transferred to the H-AAA server 5 of the MVNO without having to pass through the P-AAA server 4. Thus, information used by the MVNO to perform authentication or billing for communication performed via the MVNO base station 20 may not necessarily be the same as information used by MNO to perform authentication or billing. Therefore, the MVNO may set conditions of authentication or billing for communication performed via the MVNO base station 20 at the discretion of the MVNO, and may customize the authentication or billing method as desired.

In addition, a system that operates in the manner as in Cases 1 to 4 may reduce the load on the P-AAA server 4, which may also be beneficial to the MNO. Since an authentication request message that has passed through the MVNO base station 20 is not forwarded to the P-AAA server 4, the P-AAA server 4 may only be required to process authentication request messages received via the MNO base station 2. Thus, the number of messages processed by the P-AAA server 4 may be reduced. If the load on the P-AAA server 4 is increased in future due to the development of business by the MNO or MVNO, the use of the method described above may reduce the load on the P-AAA server 4.

Figure 6:
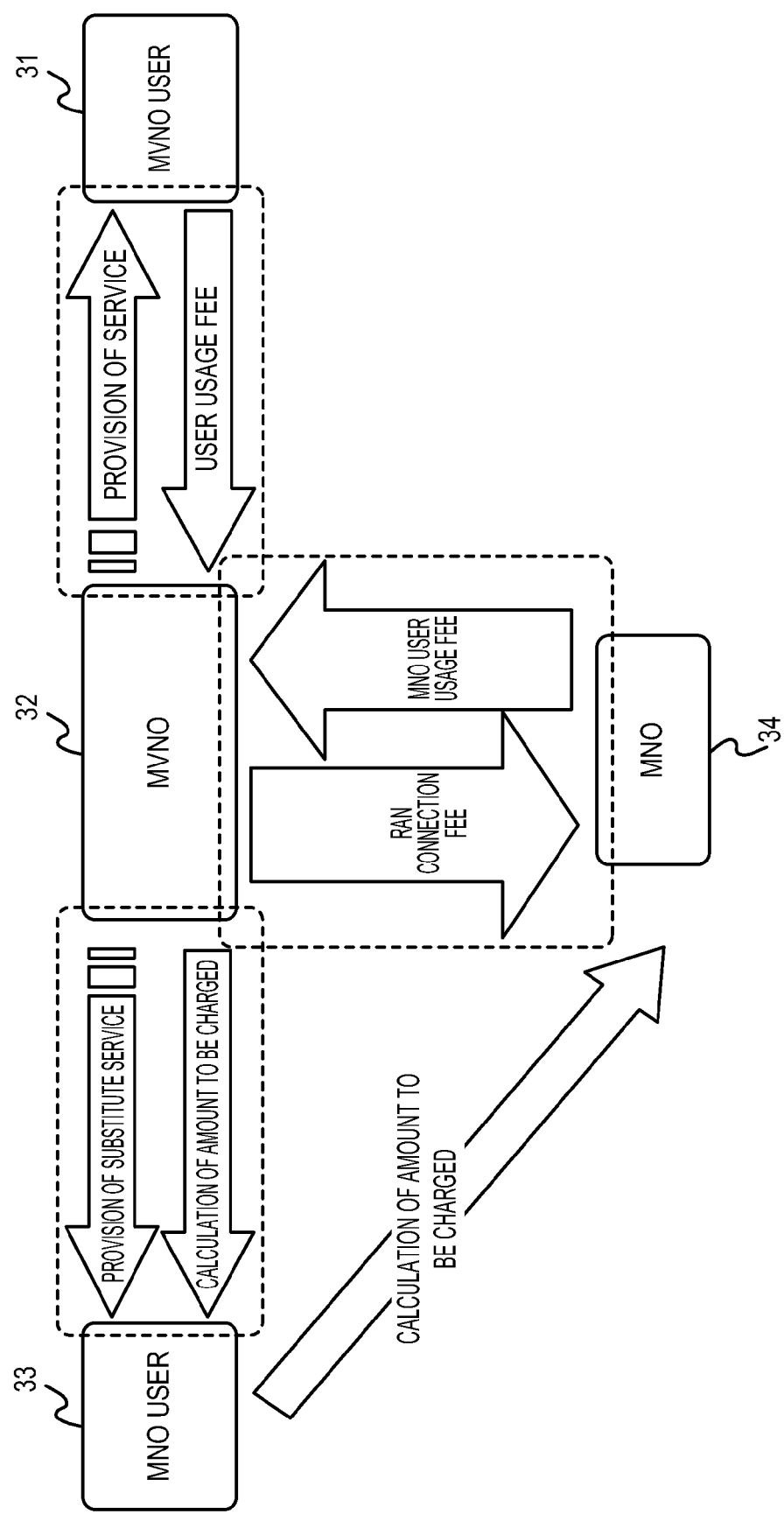
FIG. 6 is a diagram illustrating an example of a payment method for a fee generated for charging for communication performed via a MVNO base station.

FIG. 6 is a diagram illustrating an example of a payment method for a fee generated by charging for communication performed via the MVNO base station 20. When a MVNO user 31 performs communication via the MVNO base station 20, as described in Case 1, the H-AAA server 5 of the MVNO performs authentication and billing. Then, as illustrated in FIG. 6, a MVNO 32 provides service to the MVNO user 31, and the MVNO user 31 pays a user usage fee to the MVNO 32.

In contrast, as in Case 2, when a MNO user 33 performs communication via the MVNO base station 20, authentication is performed by the H-AAA server 6 of the MNO. When the authentication has succeeded in the H-AAA server 6, the MVNO 32 provides, on behalf of a MNO 34, communication (substitute service) to the mobile terminal 1*b* via the MVNO base station 20. Furthermore, the H-AAA server 5 of the MVNO calculates a usage fee for the substitute service. Then, in the relationship between the MVNO 32 and the MNO user 33, as illustrated in FIG. 6, the MVNO 32 provides communication service to the MNO user 33 and calculates the amount to be charged. The MNO user 33 pays the user usage fee to the MNO 34. Here, even when the MNO user 33 receives service from the MVNO 32 instead of the MNO 34, the MNO user 33 does not pay the usage fee directly to the MVNO 32 because there is no contract between the MNO user 33 and the MVNO 32.

The MNO 34 that has received the user usage fee from the MNO user 33 pays a usage fee for the substitute service, which has been provided to the MNO user 33, to the MVNO 32. Since the MVNO 32 leases a Radio Access Network (RAN) from the MNO 34 to provide service, the MVNO 32 pays a RAN connection fee to the MNO 34. Depending on the agreements or the like between the MNO 34 and the MVNO 32, the MVNO 32 may pay the balance between the MNO user's usage fee and the RAN connection fee to the MNO 34.

In calculating an amount to be charged, the MVNO 32 may calculate a usage fee for the substitute service provided to the MNO user 33 using a method different from that for the user usage fee of the MVNO user 31. Further, the billing method may be based on any of packet-based charging and time-based charging. The amount to be charged may be calculated based on any pricing structure such as a flat-rate pricing structure, a metered-rate pricing structure, or a price cap plan structure. Data used for the calculation of the amount to be charged, such as the communication time or the number of communication packets, may be managed by the MVNO base station 20 or by the ASNGW 3. The H-AAA server 5 of the MVNO calculates the amount to be charged on the basis of the information obtained from the MVNO base station 20 or the ASNGW 3, and sends the amount to be charged to the H-AAA server 6 of the MNO 34.

Figure 7:
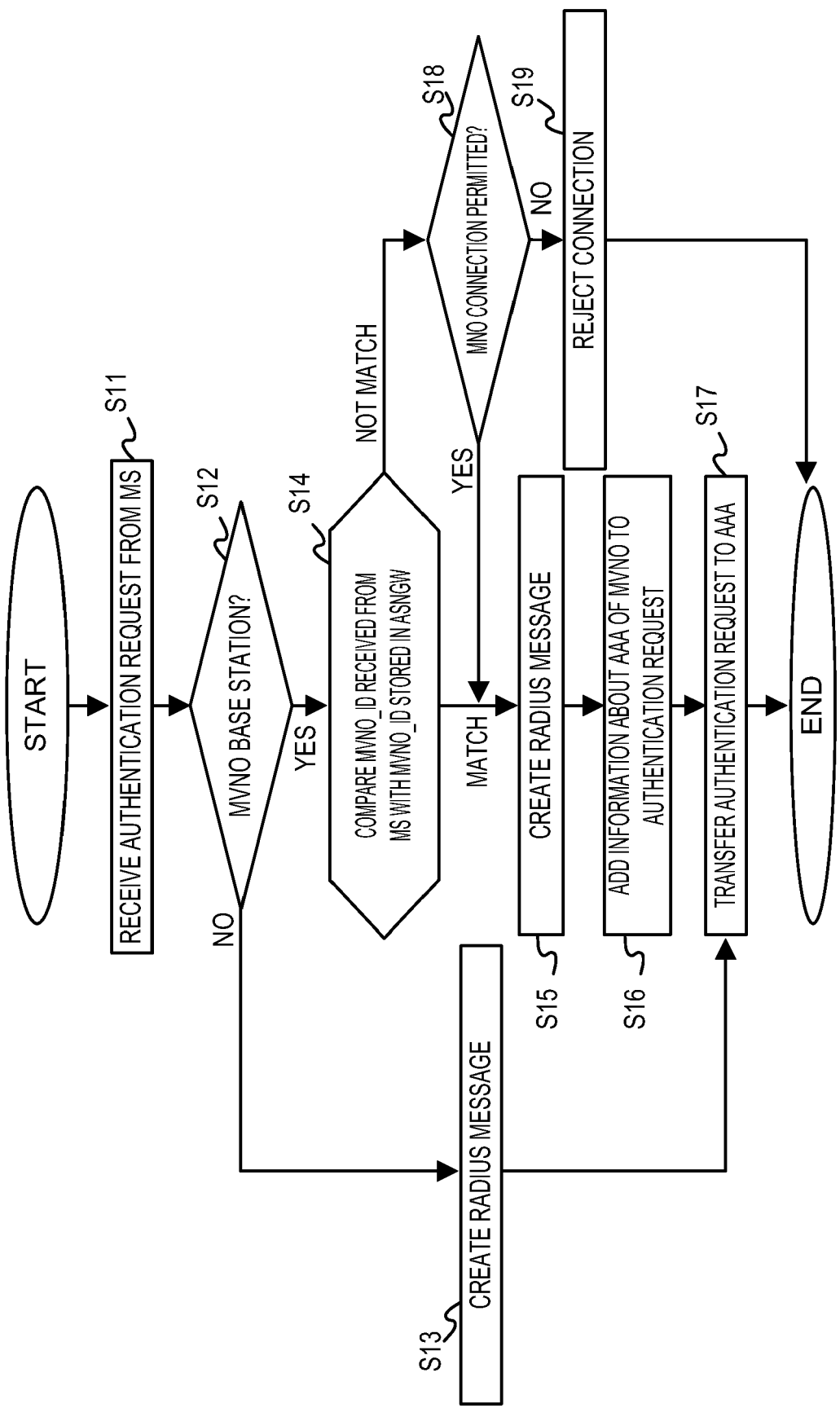
FIG. 7 is a flowchart illustrating an example of an operation of an ASNGW.

FIG. 7 is a flowchart illustrating an example of the operation of the ASNGW 3. Operation S11 to S13 and S17 are performed by the ASNGW 3 in Cases 3 and 4. Operation S11, S12, and S14 to S17 represent the operation in Case 1. Operation S11, S12, and S14 to S18 represent the operation in Case 2. In the example illustrated in FIG. 7, it is assumed that an authentication request message transmitted from a mobile terminal 1 to the ASNGW 3 includes a base station identifier for identifying the MVNO base station 20 or a MNO base station identifier for identifying the MNO base station 2. In the illustration of FIG. 7, the ASNGW 3 generates an RADIUS message based on a received authentication request message, and transmits the RADIUS message to the P-AAA server 4 or the H-AAA server 5.

Upon receipt of an authentication request message from the mobile terminal 1, the ASNGW 3 checks the base station identifier or MNO base station identifier included in the authentication request message, and determines whether or not the authentication request message has been received via the MVNO base station 20 (operation S11 and S12). When the authentication request message has been received via the MNO base station 2, the ASNGW 3 transmits a RADIUS message created based on the received authentication request message to the P-AAA server 4 (operation S13 and S17).

When the authentication request message has been received from the MVNO base station 20, on the other hand, the ASNGW 3 compares the MVNO identifier included in the authentication request message with the MVNO identifier stored in the ASNGW 3 (operation S14). When both match, the ASNGW 3 adds information about the H-AAA server 5 of the MVNO to a RADIUS message created based on the received authentication request message, and transmits the resulting RADIUS message to the H-AAA server 5 (operation S15 to S17).

When the MVNO identifier included in the authentication request message received from the MVNO base station 20 is different from the MVNO identifier stored in the ASNGW 3, the mobile terminal 1 that has transmitted the authentication request message is a MNO user terminal. Thus, when the MVNO identifier included in the authentication request message is different from the stored identifier, it is determined whether or not a connection from the MNO user is permitted (operation S18). When a connection from the MNO user is permitted, the RADIUS message is transmitted to the H-AAA server 5 of the MVNO (operation S15 to S17). When a connection from the MNO user is not permitted, the connection is rejected and the process ends (operation S19). When the connection is rejected, an error message may be transmitted to the mobile terminal 1, or the operation of the ASNGW 3 may be terminated without informing the mobile terminal 1 of the rejection.

As described above, an authentication request message that has passed through the MVNO base station 20 is directly processed by the H-AAA server 5 of the MVNO. Thus, the MVNO may customize the method of authentication or billing via the MVNO base station 20 as desired. For example, a usage fee may be changed in accordance with the condition of the MVNO base station 20, and the MVNO base station 20 installed in a region where it is difficult to build a communication infrastructure, such as an island or a mountainous region, may use an additional pricing option. Thus, a commercially viable pricing structure may be realized. With the use of the method of an embodiment, the MVNO may develop business using the MVNO base station 20 in an island or the like, thereby overcoming the digital divide. In addition, in an area within which the MVNO wishes to increase market share, conversely, the MVNO may set a discount rate for communication performed via the MVNO base station 20 situated in a target area.

Such billing conditions for each MVNO base station 20 may be collectively set or changed by the H-AAA server 5, and an operator at the H-AAA server 5 may perform setting using a desired user interface or command. Furthermore, a plurality of billing conditions may be prepared in advance in the H-AAA server 5, and when a billing condition is set or changed, the H-AAA server 5 may send a notification of a suitable billing condition to the MVNO base station 20 for which the setting is made. Moreover, the H-AAA server 5 may also set or change billing conditions per unit of areas.

Here, it may be desirable that MVNOs inform users of a billing rate different from a normal fee, such as a discount fee or an additional fee. For example, the application of a discount fee may be indicated with a visual marker or the like on the mobile terminals 1 to facilitate user recognition. This may involve a potential increase in advertising awareness. Further, the mobile terminals 1 may be informed of the application of an additional fee, thus avoiding trouble over fees charged to users. Further, in a system, desirably, a user located in communication areas of a plurality of base stations having different billing conditions is allowed to select a desired base station as the connection destination.

Accordingly, a system that allows the MVNO base station 20 or the MNO base station 2 to notify the mobile terminals 1 of conditions relating to connections, such as billing conditions, and that allows users to select a desired base station will now be described with reference to FIGS. 8 to 15. With the use of the method described below, a MVNO may provide service that allows a MVNO user to select a base station to which a mobile terminal 1 is to be connected. In this system, furthermore, the MVNO may contract with a specific MNO user to allow the contracted MNO user to select a base station.

Figure 8:
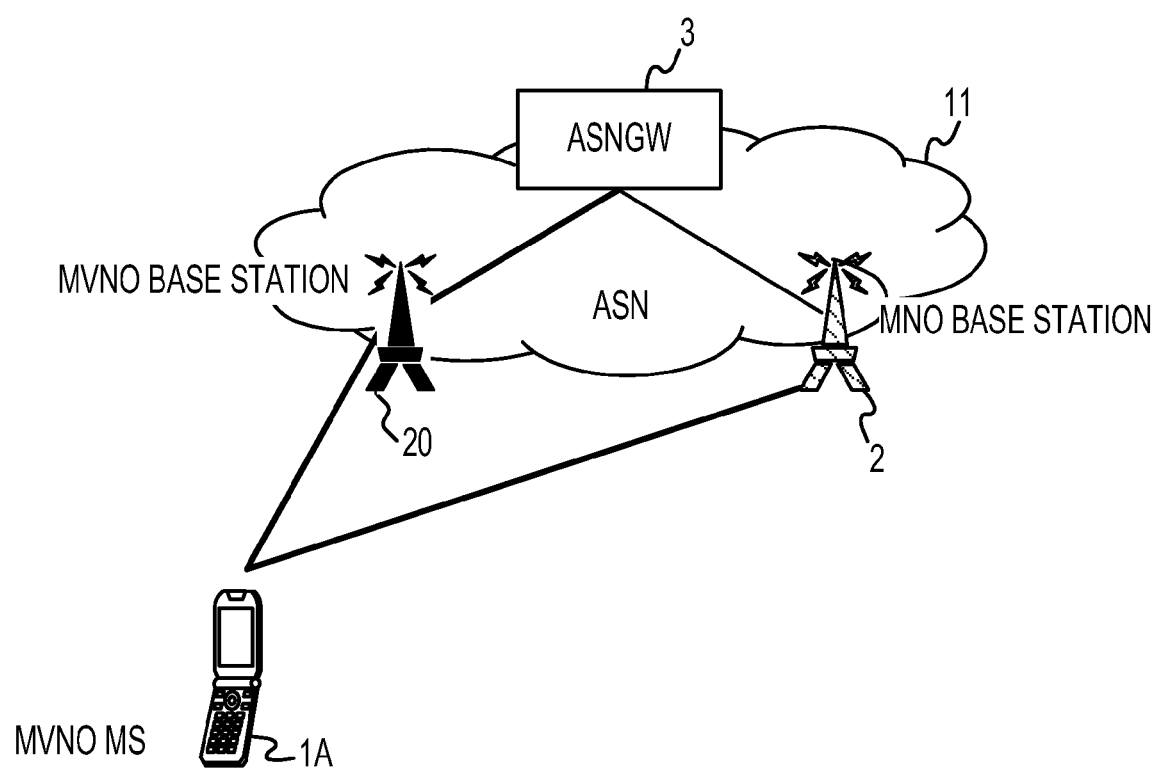
FIG. 8 is a diagram illustrating an example of a method for allowing a base station to select a desired mobile terminal.

FIG. 8 is a diagram illustrating an example of a method for allowing (enabling) the mobile terminal 1a to select a desired base station. In an embodiment, it is assumed that the mobile terminal 1a is located in a communication area covered by both base stations, namely, the MNO base station 2 and the MVNO base station 20. The MVNO base station 20 and the MNO base station 2 notify, when transmitting a notification signal, the mobile terminal 1a of service available via the MVNO base station 20 and the MNO base station 2 and conditions such as billing conditions. The mobile terminal 1a selects a desired base station as the connection destination in accordance with a predetermined connection policy, and transmits a ranging message (Initial Ranging). When the mobile terminal 1a has no predetermined connection policy, conditions sent from the MVNO base station 20 and the MNO base station 2 may be displayed on a screen provided in the mobile terminal 1a, and a desired base station may be selected in accordance with a user input.

Figure 9:
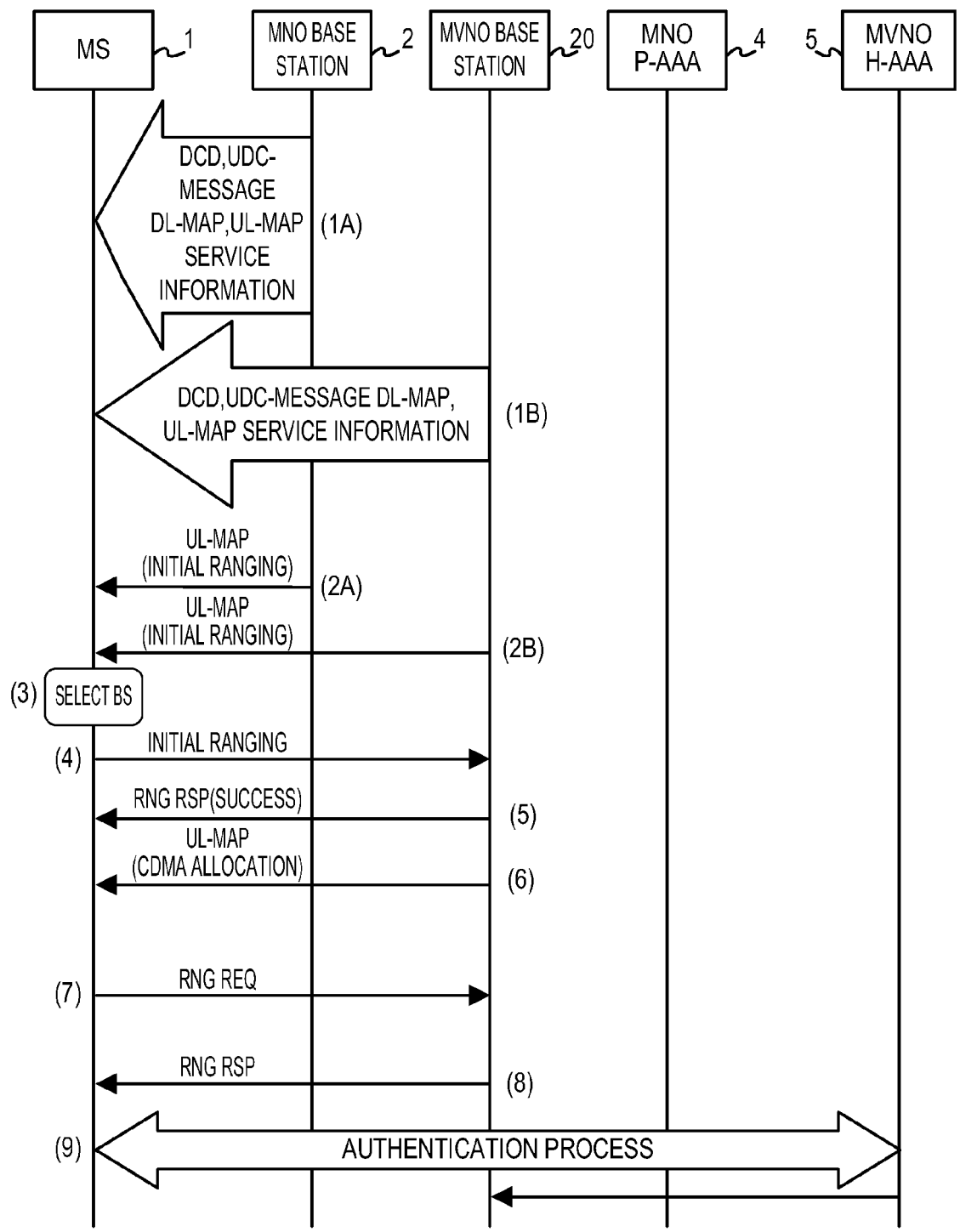
FIG. 9 is a sequence diagram illustrating an example of an operation performed when a mobile terminal selects a desired base station.

FIG. 9 is a sequence diagram illustrating an example of an operation performed when the mobile terminal 1a selects a desired base station. The mobile terminal 1a is located in the communication area of overlapping coverage of the two base stations, namely, the MNO base station 2 and the MVNO base station 20, and receives notification signals from both the MNO base station 2 and the MVNO base station 20. The example in FIG. 9 illustrates a case where service information received from the MNO base station 2 is compared with service information received from the MVNO base station 20 and where the mobile terminal 1a is connected to the MVNO base station 20.

(1) As indicated in (1a) and (1b), the MNO base station 2 and the MVNO base station 20 broadcast notification signals. Each of the notification signals includes a Downlink Channel Descriptor (DCD) message, an Uplink Channel Descriptor (UCD) message, a Downlink Mapping (DL-MAP) message, an Uplink Mapping (UL-MAP) message, and service information. The MNO base station 2 and the MVNO base station 20 include base station identifiers for identifying the MNO base station 2 and the MVNO base station 20, respectively, in the notification signals which are transmitted. Each of the base station identifiers may be implemented using, for example, but not limited to, a Code-Division Multiple Access (CDMA) code. Each of the base station identifiers may be an identifier capable of uniquely specifying a base station.

Here, the service information includes desired conditions that may be used by the mobile terminal 1a to select a desired base station as the connection destination, such as, for example, but not limited to, a pricing structure applied when the base station is used, available service, and throughput. The DCD message defines characteristics of the downlink physical layer, and the UCD message defines characteristics of the uplink physical layer. The DL-MAP message includes downlink burst allocation information, and the UL-MAP message includes uplink burst allocation information.

Figure 10:
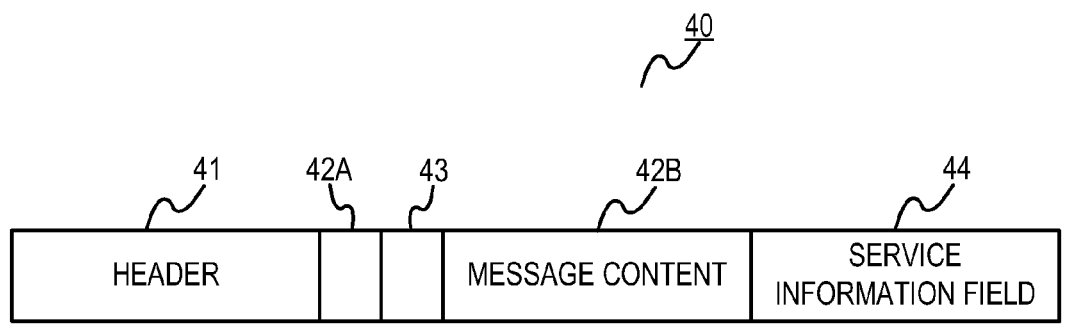
FIG. 10 is a diagram illustrating an example of a notification signal broadcast from a base station.

FIG. 10 is a diagram illustrating an example of a notification signal 40 broadcast from a base station. The notification signal 40 includes a header 41, message content 42, a check field 43, and a service information field 44. The header 41 and the message content 42 (42a, 42b) include information indicating that the signal is the notification signal 40, the DCD message, the UCD message, the DL-MAP message, the UL-MAP message, and any other suitable messages. The check field 43 is a field indicating whether or not service information is being transmitted, and the mobile terminal 1a checks the check field 43 to recognize whether or not the service information field 44 includes service information. For example, when the service information field 44 includes service information, all the bits of the check field 43 may be "1". Accordingly, the base stations (2, 20) and the mobile terminal 1a recognize in advance the value of the check field 43 that includes service information. A procedure in which the mobile terminal 1a selects a desired base station as the connection destination using the service information will be described in detail below.

(2) As indicated in (2a) and (2b), the MNO base station 2 and the MVNO base station 20 broadcast the UL-MAP messages. The mobile terminal 1a obtains from the UL-MAP messages the intervals during which the MNO base station 2 and the MVNO base station 20 perform initial ranging.

Figure 11:
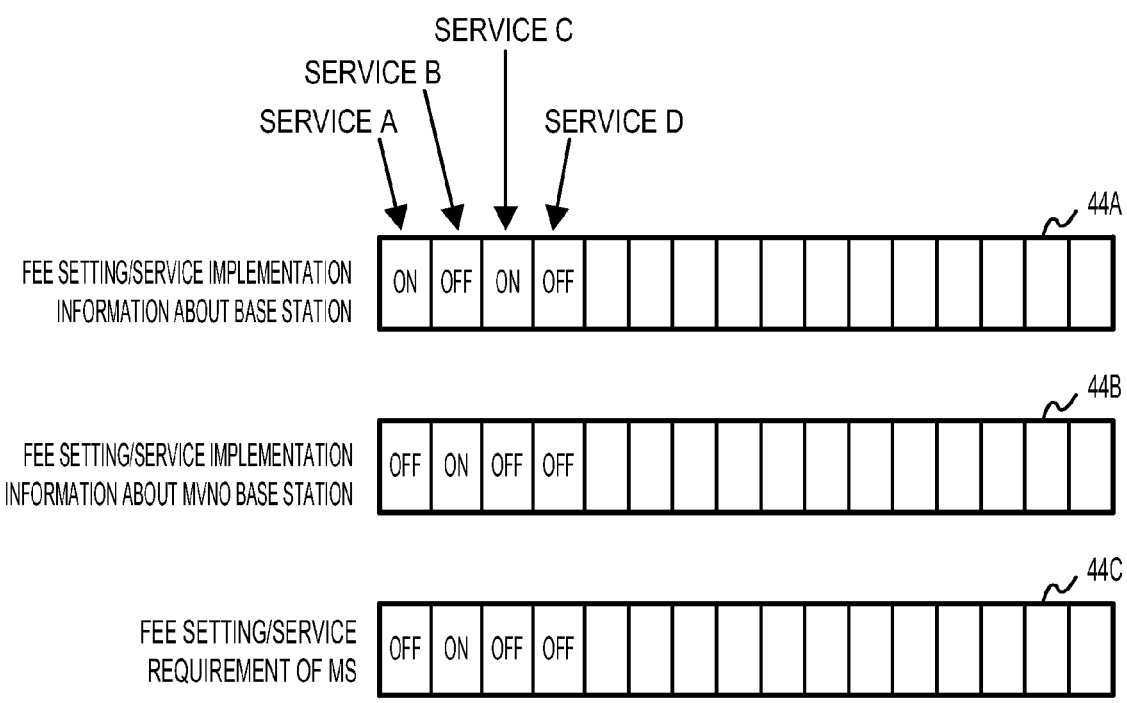
FIG. 11 is a diagram illustrating an example of a service information field and a connection policy of a mobile terminal.

(3) The mobile terminal 1a compares the content of the service information transmitted from each of the MNO base station 2 and the MVNO base station 20 with the connection policy of the mobile terminal 1a, and determines a desired base station (BS) as the connection destination. FIG. 11 is a diagram illustrating an example of a service information field and the connection policy of the mobile terminal 1a. Here, it is assumed that the notification signal 40 transmitted from the MNO base station 2 includes a service information field 44a and that the notification signal 40 transmitted from the MVNO base station 20 includes a service information field 44b. It is also assumed that the example of the connection policy of the mobile terminal 1a, when represented using a scheme written in the service information field 44, may be represented in a manner as in a service information field 44c. In the illustrated example, the mobile terminal 1a does not use services A, C, and D but uses a service B. Thus, upon receipt of the notification signals 40 from the MNO base station 2 and the MVNO base station 20, the mobile terminal 1a checks the service information fields 44a and 44b in the received messages, and searches for a base station that is available to provide the service B. As illustrated in FIG. 11, the MNO base station 2 is not available to provide the service B but the MVNO base station 20 is available to provide the service B. Thus, the mobile terminal 1a selects the MVNO base station 20 as the connection destination.

(4) The mobile terminal 1 transmits an Initial Ranging message to the MVNO base station 20 that has been determined as the connection destination. In this case, the mobile terminal 1 includes a base station identifier for identifying the MVNO base station 20 in the Initial Ranging message. The mobile terminal 1 does not send a response to the MNO base station 2 that is not determined as the connection destination.

(5) The MVNO base station 20 checks the radio status of the mobile terminal 1a from the Initial Ranging message, and transmits a Ranging Response (RNG RES) message to the mobile terminal 1a. When the radio status of the mobile terminal 1 meets the condition required by the MVNO base station 20, the MVNO base station 20 transmits a message indicating "Success" to the mobile terminal 1a. When the radio status of the mobile terminal 1a is outside the condition required by the MVNO base station 20, the MVNO base station 20 transmits a message indicating "Abort" or "Continue" to the mobile terminal 1a.

(6) When the message indicating "Success" is transmitted to the mobile terminal 1a, the MVNO base station 20 records the success of ranging in CDMA Allocation included in the UL-MAP message, which is transmitted to the mobile terminal 1a.

(7) The mobile terminal 1a transmits a Ranging Request (RNG REQ) message to the MVNO base station 20, and enters a bandwidth allocation procedure.

(8) The MVNO base station 20 transmits a RNG RES message to the mobile terminal 1a to inform the mobile terminal 1a of the Radio Frequency (RF) power level adjustment value, the frequency offset value, the timing offset value, and any other suitable value.

(9) A connection is established between the mobile terminal 1a and the MVNO base station 20, and the mobile terminal 1a performs an authentication response message process with the H-AAA server 5 of the MVNO via the MVNO base station 20.

Figure 12:
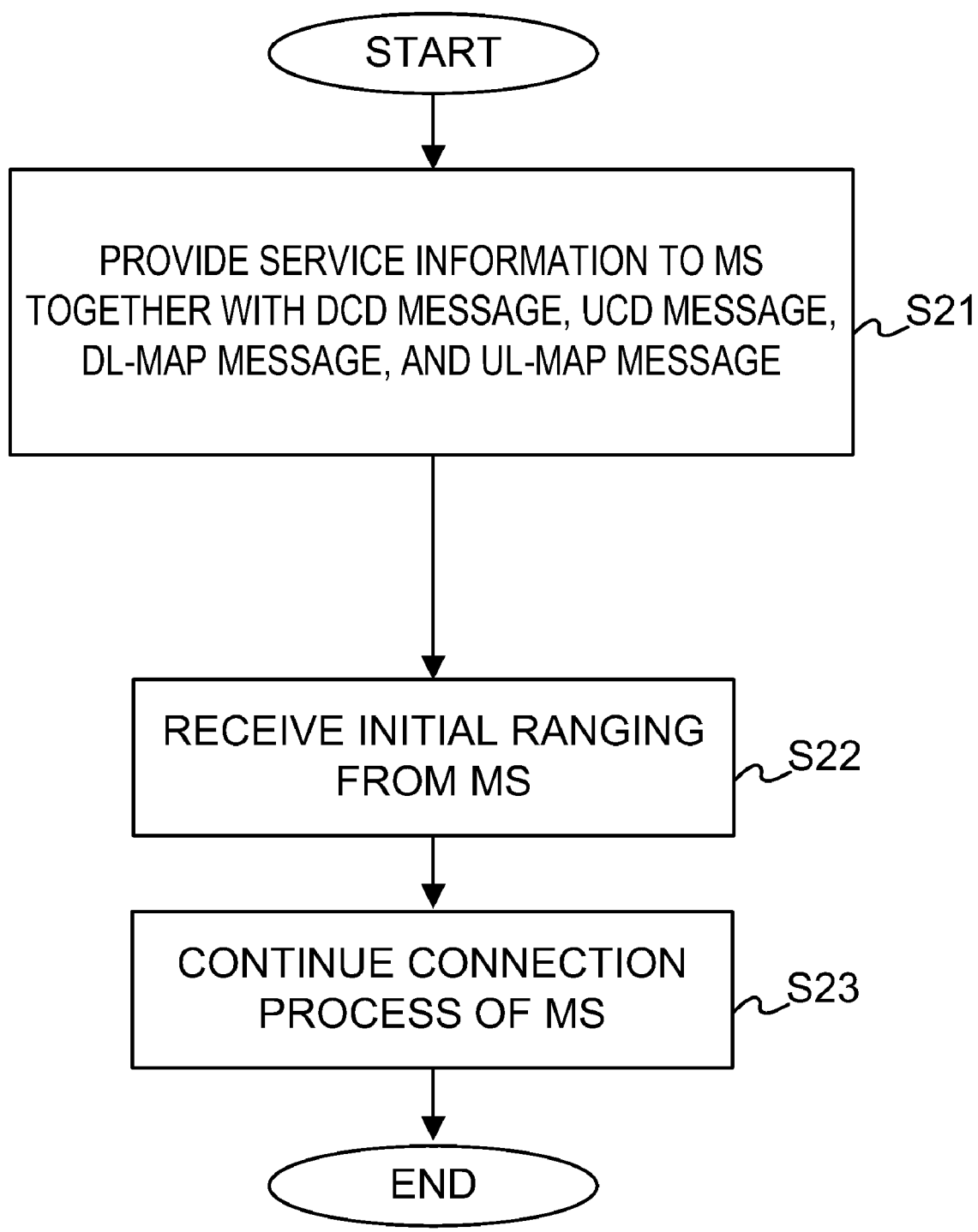
FIG. 12 is a flowchart illustrating an example of an operation of a base station in a connection method that allows a selection of a base station.

FIG. 12 is a flowchart illustrating an example of the operation of a base station in a connection method that allows the selection of a base station. Each of the base stations (2, 20) broadcasts service information together with a DCD message, a UCD message, a DL-MAP message, and a UL-MAP message to inform the mobile terminal 1 located in the communication area of service information such as available service (operation S21). A base station that has received an Initial Ranging message from the mobile terminal 1a performs a connection process of the mobile terminal 1a (operation S22 and S23).

Figure 13:
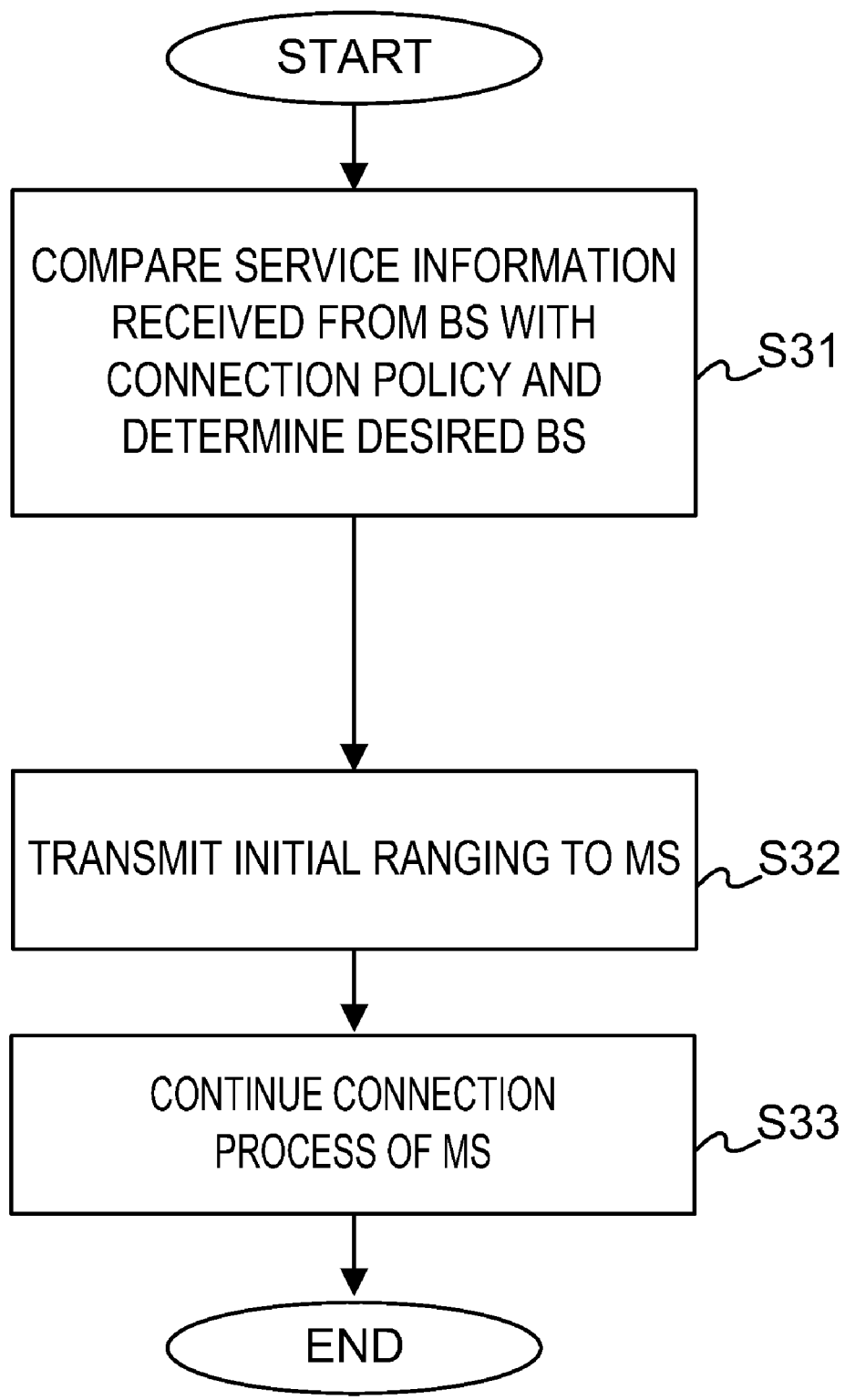
FIG. 13 is a flowchart illustrating an example of an operation of a mobile terminal in a connection method that allows a selection of a base station.

FIG. 13 is a flowchart illustrating an example of the operation of the mobile terminal 1a in a connection method that allows the selection of a base station. The mobile terminal 1a compares service information received from the base stations (2, 20) with the connection policy, and determines a desired base station as the connection destination (operation S31). Then, the mobile terminal 1a transmits an Initial Ranging message to the base station selected as the connection destination, and performs a connection process (operation S32 and S33).

With the use of the above method, users such as MVNO users and contracted MNO users are provided with a connection method that allows the selection of a base station. In the procedure (3) described with reference to FIG. 11, the mobile terminal 1a selects a desired base station as the connection destination in accordance with the connection policy stored therein. Alternatively, the mobile terminal 1a may select a desired base station as the connection destination in accordance with a user input. In this case, for example, base stations that may be connected to the mobile terminal 1a and fees applied in each of the base stations are displayed on the screen. Then, when the user selects the MVNO base station 20 to which a discount fee is applied, in procedure (4), the mobile terminal 1a transmits an Initial Ranging message to the selected MVNO base station 20.

The example in which the MVNO base station 20 that is available to provide the service desired by the mobile terminal 1a exists has been described with reference to FIG. 11. However, neither the MNO base station 2 nor the MVNO base station 20 to which the mobile terminal 1a may be connected may meet the connection condition of the mobile terminal 1a. Thus, when none of the base stations (2, 20) is available to provide the desired service, the mobile terminal 1a may additionally store a condition for selecting a base station. For example, priorities may be set for the services in order with the service B given the highest priority and the service A, the service C, and the service D given subsequent priorities in descending order. When there is no base station that is available to provide the service B, the mobile terminal 1a may be connected to a base station that is available to provide the service A.

The connection method may also be set on the basis of the billing condition in addition to the service type. For example, a setting may be made so that the mobile terminal 1a is connected to a base station to which a normal fee or a discount fee is applied but not to a base station to which an additional fee is applied. Further, billing condition priorities may be given to "discount fee", "normal fee", and "additional fee" in descending order, and the mobile terminal 1a may be connected to a base station to which the additional fee is applied unless a base station to which the normal fee is applied exists.

Figure 14:
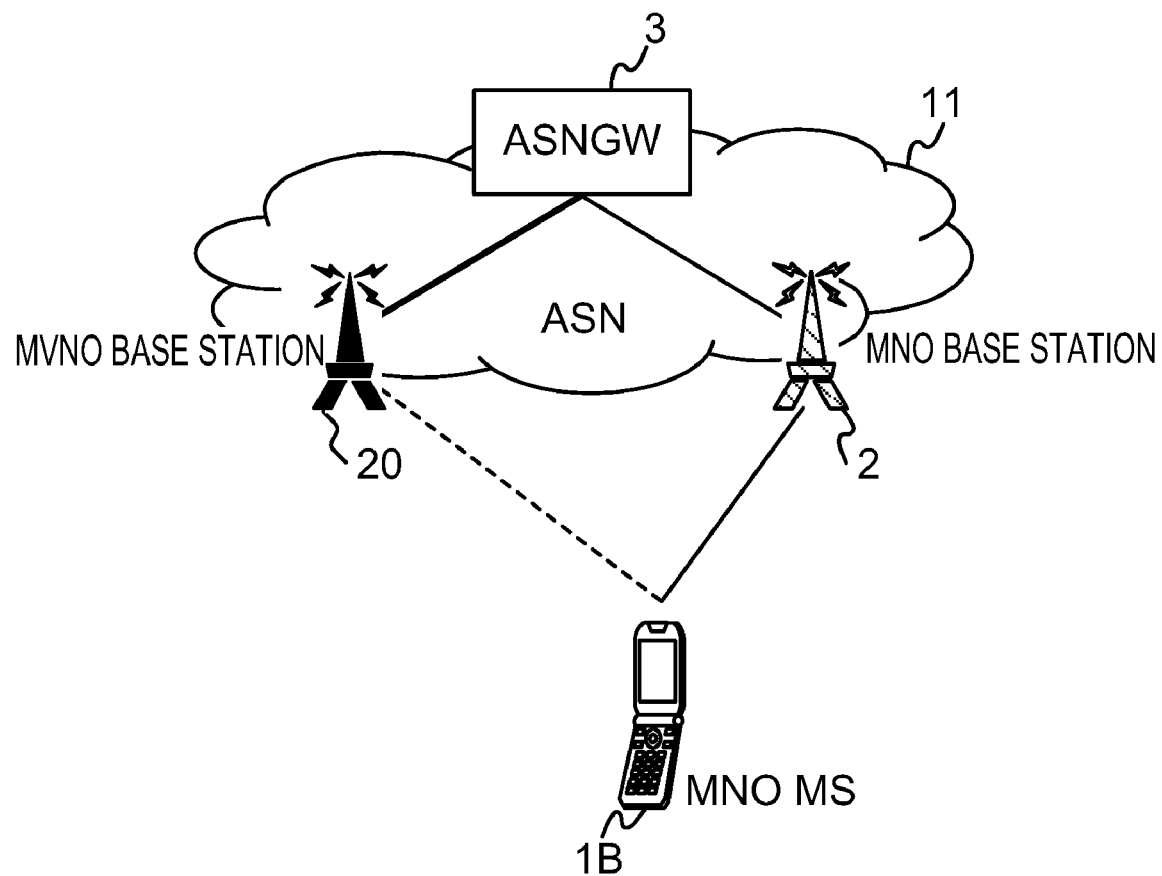
FIG. 14 is a sequence diagram illustrating an example of an operation performed when a mobile terminal is connected to a MNO base station.

FIG. 14 is a diagram illustrating an example of an operation performed when the mobile terminal 1b is connected to a base station. Here, it is assumed that the mobile terminal 1b is a mobile terminal 1 that does not support the notification of service information for selecting a desired base station. Thus, even upon receipt of the notification signal 40 indicating that the check field 43 includes service information, the mobile terminal 1b does not select a desired base station as the connection destination using the content of the service information field 44. A base station to which the mobile terminal 1b is to be connected is determined in accordance with the intensity or the like of the notification signal 40 transmitted from the MNO base station 2 or the MVNO base station 20.

Figure 15:
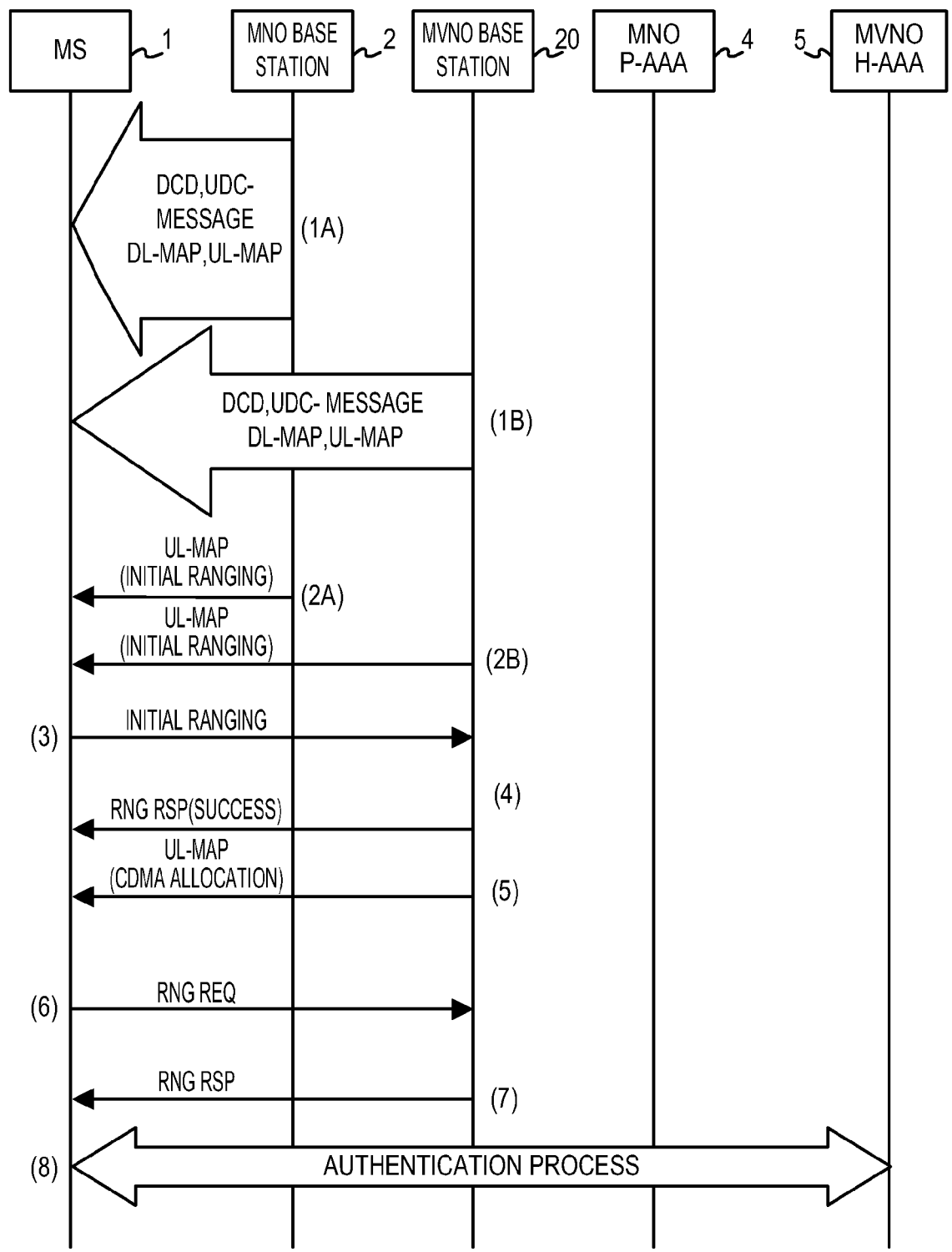
FIG. 15 is a sequence diagram illustrating an example of an operation performed when a mobile terminal is connected to a MNO base station.

FIG. 15 is a sequence diagram illustrating an example of an operation performed when the mobile terminal 1b is connected to a base station.

(1) As indicated in procedures (1a) and (1b), the MNO base station 2 and the MVNO base station 20 broadcast notification signals. Each of the notification signals includes a DCD message, a UCD message, a DL-MAP message, a UL-MAP message, and a base station identifier.

(2) As indicated in procedures (2a) and (2b), the MNO base station 2 and the MVNO base station 20 broadcast the UL-MAP messages.

(3) The mobile terminal 1b obtains from the UL-MAP messages the intervals during which the MNO base station 2 and the MVNO base station 20 perform initial ranging. Further, the mobile terminal 1b selects a desired base station as the connection destination on the basis of the intensity or the like of the notification signals received in procedure (1), and transmits an Initial Ranging message to the selected base station. Here, since the mobile terminal 1b is a mobile terminal 1 that does not support the notification of service information, service information is not used for the selection of a base station even when the service information is included in the service information field 44.

The operation in procedures (4) to (8) is similar to that in procedures (5) to (9) described with reference to FIG. 9. The MVNO base station 20 which is the connection destination transmits an RNG RSP message indicating "Success" and CDMA Allocation to the mobile terminal 1b. When band allocation and the notification of the frequency offset values and the like are completed between the mobile terminal 1b and the MVNO base station 20, the mobile terminal 1b performs an authentication response message process with the H-AAA server 5 via the MVNO base station 20.

Accordingly, since the presence of service information is checked using the check field 43, the mobile terminals 1 may be notified of service information using the notification signal 40 without interference with the operation of the mobile terminals 1 if the mobile terminals 1 do not use the service information to select a base station.

The present invention is not to be limited to the foregoing embodiments, and a variety of modifications may be made. Some examples will now be described.

In the foregoing description, one MVNO is used. An exemplary modification of the operation in Case 1 for performing authentication when a first MVNO and a second MVNO provide individual service and the MVNO base station 20 is operated by the first MVNO will now be described. In this exemplary modification, the first MVNO may prevent the second MVNO from providing service using the MVNO base station 20. In this case, the ASNGW 3 stores in advance an identifier for identifying the first MVNO as the identifier of a company that operates an object to which a control message is transferred, but does not store the MVNO identifier of the second MVNO.

In procedure (3) in Case 1, the ASNGW 3 checks the MVNO identifier included in the authentication request message, and determines whether or not the MVNO identifier specifies a company that operates an object to which a control message is transferred. For example, when the MVNO base station 20 is specified by the base station identifier and the MVNO identifier indicates the first MVNO, the ASNGW 3 transmits an authentication request message to the H-AAA server 5 of the first MVNO. When the MVNO identifier included in the authentication request message that specifies the MVNO base station 20 is an identifier for identifying the second MVNO, the ASNGW 3 rejects authentication, and does not transfer the authentication request message.

With the above exemplary modification, in an area where a plurality of MVNOs develop business, the first MVNO may reject authentication or billing of users of other MVNOs.

Furthermore, a modification of the operation described in Case 2 may allow authentication of a mobile terminal 1 of a user of a MVNO different from the MVNO that operates the MVNO base station 20. That is, access from a mobile terminal 1 of a user of a third MVNO is authorized via the MVNO base station 20 of the first MVNO using an operation similar to the operation described in Case 2. In this case, the MVNO identifier of the third MVNO that permits user communication may be registered in advance in the ASNGW 3. Then, the user of the third MVNO whose MVNO identifier has been registered may be authorized, and the amount to be charged thereto may be calculated. In such a case, the first MVNO notifies the third MVNO of the amount to be charged calculated by the H-AAA server 5, and the usage fee of the MVNO base station 20 may be collected from the third MVNO.

In addition, any of the foregoing embodiments may also be implemented using mobile IPs, and may be implemented using a desired radio interface standardized in International Mobile Telecommunications-2000 (IMT-2000).

In FIG. 2, a system in which the home agent 7 is provided in the CSN 12 has been described by way of example. However, the home agent 7 may be provided in the MVNO network 13.

Further, in the illustration of FIGS. 2, 3A, 3B, 4 and 5, each of the mobile terminals 1 is notified of a base station identifier using a notification signal, by way of example. The MNO base station 2 or the MVNO base station 20 may also notify each of the mobile terminals 1 of a base station identifier using any control signal other than a notification signal.

Further, in any of Cases 1 to 4, the ASNGW 3 may store the relationship between the numbers of ports and the base stations (2, 20) connected to the ports. In this case, the ASNGW 3 may also determine whether or not an authentication request message has passed through the MVNO base station 20 on the basis of the number of the port at which the authentication request message has been received. That is, the ASNGW 3 may be modified so as to determine from which base station of the MNO base station 2 and the MVNO base station 20 a control message has been received without using a base station identifier. The relationship between the numbers of the ports and the base stations (2, 20) connected to the ports may also be stored as a table in a memory of the ASNGW 3.

Accordingly, there is provided an authentication and billing method in which an authentication request received by a relay device via the MVNO base station 20 is transferred to the H-AAA server 5 of the MVNO regardless of whether the authentication request is an authentication request from a MVNO user or an authentication request from a MNO user. The H-AAA server 5 of the MVNO determines whether or not access is permitted in response to an authentication request transmitted from a MVNO user. Further, the H-AAA server 5 transfers an authentication request transmitted from a MNO user to the H-AAA server 6 of the MNO. With the use of the above method, the MVNO may set or change information used by the MVNO for authentication and billing regardless of the authentication and billing method performed by the MNO. That is, the MVNO may customize the billing method or the authentication method as desired.

According to an embodiment, a computer implemented method of managing a service to a mobile terminal includes receiving a request including from the mobile terminal using a leased base station configured to provide a service, and determining a transfer destination of the request based on a base station through which the authentication request message has passed. A relay device may be located between a first base station or a second base station configured to selectively provide a service of a mobile network operator and an authentication device or an authentication device managed by the mobile network operator.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A method of authenticating a mobile terminal using a Mobile Virtual Network Operator (MVNO) authentication device managed by a mobile virtual network operator, the method comprising:

receiving an authentication request sent from the mobile terminal from a relay device via a MVNO base station configured to provide a service of the mobile virtual network operator, the relay device being located between the MVNO base station or a Mobile Network Operator (MNO) base station configured to provide a service of a mobile network operator and the MVNO authentication device or a MNO authentication device managed by the mobile network operator, the authentication request including a mobile virtual network operator identifier identifying a mobile virtual network operator and a base station identifier identifying the MVNO or MVO base station via which the authentication request is transmitted from the mobile terminal to the relay device;

determining whether access from the mobile terminal serving as a MVNO mobile terminal registered as a user of the mobile virtual network operator is permitted, based on the mobile virtual network operator identifier included in authentication request; and transferring, upon receiving the authentication request sent from a MNO mobile terminal registered as a user of the mobile network operator from the relay device, the authentication request to the MNO authentication device.

2. The method according to claim 1, comprising:

calculating an amount to be charged to the MVNO mobile terminal from which access is permitted in accordance with the base station identifier, and wherein the authentication request includes the base station identifier, and the base station identifier is configured to identify the MVNO base station, or the MNO base station that relays the authentication request.

3. The method according to claim 2, comprising:

calculating an amount to be charged to the MNO mobile terminal from which access is permitted in accordance with the base station identifier when providing the service via the MVNO base station to a MNO mobile terminal registered as a user of the mobile network operator, and notifying the MNO authentication device of the amount to be charged.

4. A method for authenticating a mobile terminal using a relay device, the method comprising:

receiving, by the relay device, an authentication request sent from the mobile terminal via a Mobile Virtual Network Operator (MVNO) base station configured to provide a service of a mobile virtual network operator or a Mobile Network Operator (MNO) base station configured to provide a service of a mobile network operator, the relay device being located between the MVNO base station or the MNO base station and a MVNO authentication device managed by the mobile virtual network operator or a MNO authentication device managed by the mobile network operator, the authentication request including a mobile virtual network operator identifier identifying a mobile virtual network operator or a mobile network operator identifier identifying a mobile network operator, and a base station identifier identifying the MVNO or MVO base station via which the authentication request is transmitted from the mobile terminal to the relay device;

determining via which of the MVNO base station and the MNO base station the authentication request has been received, based on the base station identifier included in the authentication request;

transferring the authentication request to the MVNO authentication device to determine whether access from the mobile terminal serving as a MVNO mobile terminal registered as a user of the mobile virtual network operator is permitted, based on the mobile virtual network operator identifier included in the authentication request, upon receipt of the authentication request via the MVNO base station; and transferring the authentication request to the MNO authentication device to determine whether access from the mobile terminal serving as a MNO mobile terminal registered as a user of the mobile network operator is permitted, based on the mobile network operator identifier included in the authentication request, upon receiving the authentication request via the MNO base station.

5. The method according to claim 4, comprising:
transmitting the MNO authentication request to the MVNO authentication device to transfer the MNO authentication request to the MNO authentication device upon receipt of a MNO authentication request for requesting the mobile network operator to perform authentication from a MNO mobile terminal registered as a user of the mobile network operator via the MVNO base station.

6. The method according to claim 4, comprising:
storing a terminal identifier for identifying a MVNO-base-station-associated MNO mobile terminal that is registered as a user of the mobile network operator and that represents a mobile terminal configured to receive a service via the MVNO base station;

determining whether a mobile terminal that has transmitted the authentication request is the MVNO-base-station-associated MNO mobile terminal using the terminal identifier upon receipt of an authentication request for using the service of the mobile network operator via the MVNO base station; and discarding the authentication request in a case where the authentication request is not transmitted from the MVNO-base-station-associated MNO mobile terminal.

7. The method according to claim 4, comprising:
causing the MVNO base station or the MNO base station to notify the mobile terminal of service information indicating a condition of service provided through communication performed via the MVNO base station or the MNO base station.

8. The method according to claim 5, comprising:
causing the MVNO base station or the MNO base station to notify the mobile terminal of service information indicating a condition of service provided through communication performed via the MVNO base station or the MNO base station.

9. The method according to claim 6, comprising:
causing the MVNO base station or the MNO base station to notify the mobile terminal of service information indicating a condition of service provided through communication performed via the MVNO base station or the MNO base station.

10. A mobile terminal authentication system, comprising:
a Mobile Virtual Network Operator (MVNO) base station configured to provide a service of a mobile virtual network operator;
a Mobile Network Operator (MNO) base station configured to provide a service of a mobile network operator;
a MVNO authentication device configured to be managed by the mobile virtual network operator;
a MNO authentication device configured to be managed by the mobile network operator; and
a relay device configured to execute an operation including:
receiving an authentication request from a mobile terminal via the MVNO base station or the MNO base station, the authentication request including a mobile virtual network operator identifier identifying the mobile virtual network operator or a mobile network operator identifier identifying a mobile network operator, and a base station identifier identifying the MVNO or MVO base station via which the authentication request is transmitted from the mobile terminal to the relay device,
transferring the authentication request to the MVNO authentication device to determine whether access from the mobile terminal serving as a MVNO mobile terminal registered as a user of the mobile virtual network operator is permitted, based on the mobile virtual network operator identifier included in the authentication request upon receiving the authentication request via the MVNO base station, and
transferring the authentication request to the MNO authentication device to determine whether access from the mobile terminal serving as a MNO mobile terminal registered as a user of the mobile network operator is permitted, based on the mobile network operator identifier included in the authentication request, upon receiving the authentication request via the MNO base station.

11. The authentication system according to claim 10, wherein the authentication request includes the base station identifier for identifying the MVNO base station or the MNO base station that relays the authentication request, and
wherein the MVNO authentication device calculates an amount to be charged to the MVNO mobile terminal from which access has been permitted in accordance with the base station identifier.

12. The authentication system according to claim 10, wherein the MVNO authentication device calculates, when providing service to a MNO mobile terminal registered as a user of the mobile network operator via the MVNO base station, an amount to be charged to the MNO mobile terminal from which access has been permitted in accordance with the base station identifier, and notifies the MNO authentication device of the amount to be charged.

13. The authentication system according to claim 10, wherein upon receipt of an authentication request transmitted from a MNO mobile terminal registered as a user of the mobile network operator, the MVNO authentication device transfers the authentication request transmitted from the MNO mobile terminal to the MNO authentication device.

14. The authentication system according to claim 10, wherein the relay device causes the MVNO base station or the MNO base station to notify the mobile terminal of service information indicating a condition of service provided through communication performed via one of the MVNO base station or the MNO base station.

* * * * *